United States Patent [19]

Imagawa et al.

[11] Patent Number: 5,197,196
[45] Date of Patent: Mar. 30, 1993

[54] SPIRAL CUTTER FOR USE IN AN ELECTRIC RAZOR AND A METHOD FOR MANUFACTURING THE CUTTER

[75] Inventors: Isao Imagawa; Hiroshi Takahashi; Masahiko Ochiai, all of Noogata, Japan

[73] Assignee: Kyushu Hitachi Maxell, Ltd., Fukuoka, Japan

[21] Appl. No.: 762,493

[22] Filed: Sep. 19, 1991

[30] Foreign Application Priority Data

Sep. 22, 1990 [JP] Japan .................................. 2-253918
Apr. 20, 1991 [JP] Japan .................................. 3-116742
May 8, 1991 [JP] Japan .................................. 3-133523

[51] Int. Cl.⁵ .................. B26B 19/04; B26B 19/00; B22D 19/00; B29C 33/40
[52] U.S. Cl. ................................ 30/346.51; 30/29.5; 249/83; 264/221
[58] Field of Search ............ 30/346.51, 346.53, 346.54, 30/346.55, 346.56, 346.57, 29.5, 49; 249/83, 85; 264/259, 221

[56] References Cited

U.S. PATENT DOCUMENTS

| | | | |
|---|---|---|---|
| 2,265,281 | 12/1941 | Hale | 30/43 |
| 2,577,383 | 12/1951 | Thirring | 30/346.51 |
| 2,869,310 | 1/1959 | Benson | 30/346.51 |
| 3,129,578 | 4/1964 | Horn et al. | 30/346.51 |
| 3,154,851 | 11/1964 | Erickson | 30/346.51 |
| 3,731,379 | 5/1973 | Williams | 30/29.5 |
| 3,802,793 | 4/1974 | Simon | |
| 3,944,182 | 3/1976 | Yanagita et al. | 249/83 |
| 4,151,645 | 5/1979 | Tietjens | 30/346.51 |
| 4,248,817 | 2/1981 | Frank | 264/221 |
| 4,867,157 | 9/1989 | Burlison et al. | 30/29.5 |
| 4,894,912 | 1/1990 | Tietjens | 30/43.5 |

FOREIGN PATENT DOCUMENTS

| | | |
|---|---|---|
| 0230074 | 7/1987 | European Pat. Off. |
| 1037586 | 9/1953 | France |
| 48-10693 | 2/1973 | Japan |
| 55-99287 | 7/1980 | Japan |
| 58-173577 | 10/1983 | Japan |
| 59-44970 | 3/1984 | Japan |
| 2-23238 | 6/1990 | Japan |

Primary Examiner—Douglas D. Watts
Assistant Examiner—Paul M. Heyrana, Sr
Attorney, Agent, or Firm—Wenderoth, Lind & Ponack

[57] ABSTRACT

A spiral cutter for use in an electric razor in which the lower end of a band-shaped blade made of elastic material is embedded in the peripheral surface of a body with the band-shaped blade torsionally deformed. The spiral cutter is manufactured by the steps of: mounting a band-shaped blade made of an elastic material in a body molding die with the band-shaped blade torsionally deformed; molding a base; and removing a molded product from the body molding die after the body is molded.

20 Claims, 24 Drawing Sheets

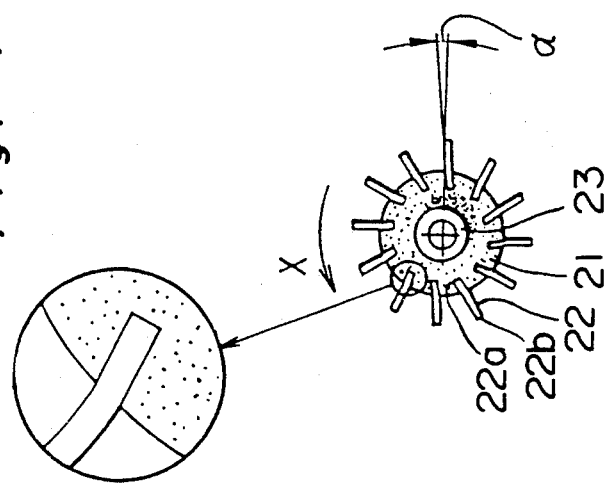
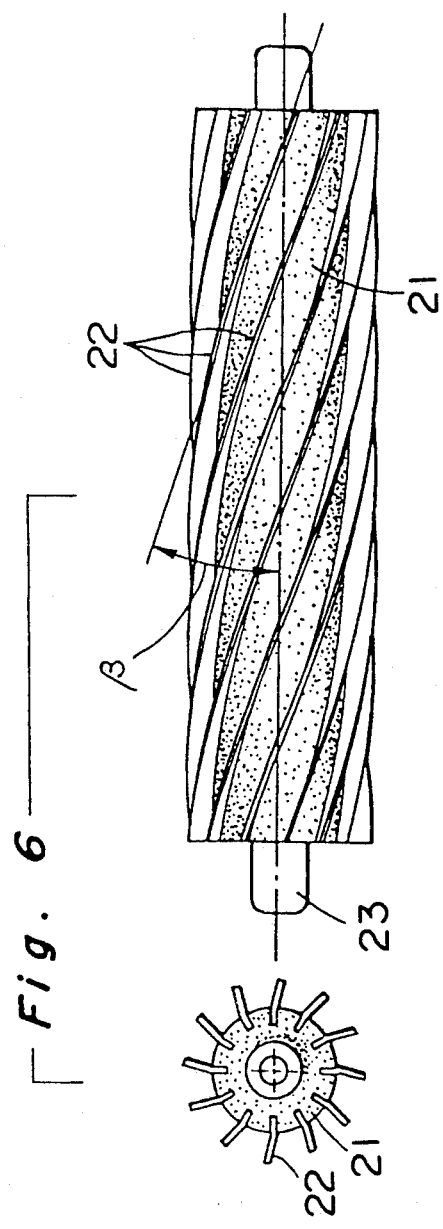

SPIRAL CUTTER FOR USE IN AN ELECTRIC RAZOR AND A METHOD FOR MANUFACTURING THE CUTTER

BACKGROUND OF THE INVENTION

1. Field of the Invention

The present invention relates to a cutter for use in an electric razor and more particularly to a cutter, the edge line of which is spiral and a method for manufacturing the cutter and in addition, a molding die for manufacturing the cutter.

2. Description of the Related Arts

Japanese Utility Model Laid-Open Publication No. 2-67969 has disclosed a spiral cutter machined from an annular or cylindrical material by using a hobbing machine, with the spiral cutter being used as the internal blade of an electric razor.

Japanese Patent Laid-Open Publication No. 2-67969 has disclosed the internal blade, of an electric razor, molded by axially inserting a straight band-shaped blade into the peripheral surface of a base for holding the blade with the blade not elastically deformed.

The above-described conventional spiral cutter machined from a material by using a hobbing machine cuts well, but the productivity thereof is low and hence the manufacturing cost is high.

The above-described conventional blade is molded by inserting the band-shaped blade into the base, so that mass production thereof is possible. But the thin band-shaped blade is subject to resistance caused by a mustache, and will likely flex to a great extent. Therefore, the cutting performance is deteriorated. The flexure of the band-shaped blade can be reduced to a great extent by reducing the height of the band-shaped blade with respect to the peripheral surface of the base, but the following problems occur: The space formed between the fixed external blade and the peripheral surface of the base is narrow. As a result, it is difficult to introduce a long mustache into the blade and the cut mustache hair are likely to be blown out from the mustache introducing openings of the fixed external blade. Thus, the height of the band-shaped blade with respect to the peripheral surface of the base cannot be too small. The flexure of the band-shaped blade can be prevented to a certain extent by thickening the band-shaped blade, but sliding resistance will increase due to the increase of the contact area between the inner surface of the fixed external blade and the band-shaped blade. Consequently, an overload is applied to the motor and it is difficult to obtain the plasticity of a desired configuration and to carry out a pressing operation.

In order to solve the above-described problems, Japanese Patent Laid-Open Publication No. 58-173677 has disclosed a spiral cutter wound around a holding groove provided on the peripheral surface of a drum by crimping both ends thereof onto the groove, i.e., the spiral cutter is fixed to the groove at only both ends thereof while the region between both ends thereof is held inside the groove. Therefore, the spiral cutter is likely to shake and incline. In addition, since a single blade is wound around the drum, the torsional angle is at least 50°. Consequently, the performance of the blade is similar to that of an unsharp end blade.

A spiral cutter according to Japanese Patent Laid-Open Publication No. 59-44970 comprises a plurality of blades. Each blade is fixed to a base at both ends thereof and the region between both ends is likely to incline and be moved due to sliding resistance and cutting resistance in a manner to the above-described conventional art. That is, the blade does not provide a clean cut.

SUMMARY OF THE INVENTION

It is an object of the present invention to provide a spiral cutter having a construction which provides a favorable cutting performance and which allows for improved productivity.

It is another object of the present invention to provide a molding die which can be produced easily and at a low cost.

In accomplishing these and other objects, there is provided a spiral cutter in which the lower end (or base portion) of a band-shaped blade made of elastic material is embedded in the peripheral surface of a base (or body) with the band-shaped blade being torsionally deformed.

The torsional angle of the band-shaped blade is smaller than 45° and favorably, 15° to 20°.

The length of the circular-arc upper end portion (an order portion) of the band-shaped blade is longer than that of the circular-arc lower end (or base) portion thereof and the lower end portion of the band-shaped blade is embedded in the base.

The upper end portion of the band-shaped blade and the embedded region of the lower end portion thereof are bent in the form of "<" in the sectional configuration at the torsion start end and torsion termination end of the band-shaped blade.

As a means for embedding the band-shaped blades in the base, the band-shaped blades are fitted into each spiral groove formed on the peripheral surface of the base by twisting and then, are fixed to each spiral groove. But more favorably, they are insert-molded in the base.

The rotation shaft is molded integrally with the base. That is, the base and the rotation shaft are integrated with each other with the same material, or the rotation shaft is insert-molded in the base when the base is molded.

The method for manufacturing a spiral cutter of the present invention comprises the steps of: mounting a band-shaped blade made of an elastic material in a base molding die with the band-shaped blade torsionally deformed; molding a base; and taking out a molded product from the base molding die after the base is molded.

In carrying out the above method, in order to form an angle corresponding to a rake angle of the band-shaped blade, preferably, a torsional deformation is decreasingly applied from the middle portion of the band-shaped blade toward the torsion beginning end thereof and increasingly applied from the middle portion of the band-shaped blade toward the torsion termination end thereof.

Injection molding is adopted if the base is made of plastic and die casting is adopted if the base is made of a molten metal such as an aluminum alloy or a zinc alloy.

Gates are provided at plural positions at the end face of the base.

In this case, preferably, the gates are provided on the end face of the base such that the gates are interposed between the lower end of the band-shaped blade and a rotation shaft.

The molding die to be used to mold the band-shaped blade by inserting the band-shaped blade into the peripheral surface of a base with the band-shaped blade torsionally deformed, is cylindrical and has a cavity for molding the base and a plurality of spiral grooves, provided in the inner peripheral surface of the cavity, into which the upper end portion of the band-shaped blade is inserted with a torsional load applied to the band-shaped blade. The molding die comprises two or more blocks divided in the circumferential direction thereof along lines conforming to the spirality of the spiral grooves.

The molding die may comprise two or more blocks divided along the axial direction thereof.

An angle corresponding to the rake angle of the band-shaped blade is formed for each spiral groove of the molding die such that a torsional deformation is decreasingly applied from the middle portion of the band-shaped blade toward the torsion beginning end thereof and increasingly applied from the middle portion of the band-shaped blade toward the torsion termination end thereof.

According to another embodiment, the lower end of each of a plurality of spiral blades is embedded in the peripheral surface of a cylindrical base with the spiral blades torsionally deformed. In the spiral cutter, the boundary line between an upper wall projecting from the base and the lower wall is bent in a multiple-broken line configuration such that walls of a predetermined length are connected with each other in the configuration of "<" from one end thereof to the other end thereof in the spiral direction so that the edge of the upper wall is formed in a spiral configuration which continuously changes.

In the above construction, flanges are provided at one end of the spiral blades in the longitudinal direction thereof so that the flanges fill the space between the adjacent spiral blades.

According to a further embodiment of the present invention, the base of the spiral cutter is made of plastic and the rotation shaft composed of a material having a rigidity higher than that of the base is insert-molded into the center of the base. In the above construction, a portion of the rotation shaft in the vicinity of the end thereof is configured to prevent the rotation shaft from being removed from the base.

According to the above construction, since the band-shaped blade made of elastic material is embedded in the base with the blade torsionally deformed, torsional stress acts in the direction opposite to the direction in which the upper end portion of the blade is flexed by being subjected to cutting resistance applied from the mustache. Therefore, the flexure of the upper end portion of the blade is greatly restrained in cutting the mustache.

Since the torsional angle of the band-shaped blade is smaller than 45°, wool or the like can be cut without slippage.

Since the length of the circular-arc upper end portion of the band-shaped blade is longer than that of the circular-arc lower end portion thereof, the blade can be uniformly embedded in the base throughout the length of the blade with the blade being torsionally deformed. Therefore, the height of each blade can be the same. That is, the blade has a favorable cutting performance.

Since the blade is insert-molded in the base, the molding cycle time can be reduced and the productivity of the spiral cutter is high.

Since the rotation shaft is molded integrally with the base, the former can be easily mounted on the latter.

In manufacturing the spiral cutter, the base is molded after the blade made of an elastic material is mounted in the molding die with the blade torsionally deformed, and then, a molded product is taken out from the molding die. Therefore, the blade can be molded integrally with the base with the blade at a certain angle. That is, the molding cycle time can be reduced and the spiral cutter can be mass-produced.

In carrying out the injection molding of the base, gates are provided at plural positions at the end face of the base. Therefore, the molding performance is favorable.

The molding die can be divided into a plurality of blocks equally in the circumferential direction thereof with the dividing lines conforming to the spirality of the spiral grooves. That is, the spiral grooves can be easily formed in the molding die by arranging the blocks in the circumferential direction of the molding die without a gap provided between adjacent blocks. In particular, since the depth and width of each spiral groove can be easily machined from a material, the thickness of the blade can be varied easily. Further, if a part of the blocks is damaged, it can be easily replaced and maintained.

The molding die can be divided into a plurality of blocks equally in the axial direction thereof. That is, the spiral grooves can be easily formed in the molding die by arranging the blocks in the axial direction of the molding die without a gap provided between adjacent blocks.

An angle corresponding to the rake angle of the band-shaped blade is formed on each spiral groove of the molding die such that a torsional deformation is decreasingly applied from the middle portion of the band-shaped blade toward the torsion beginning end thereof and increasingly applied from the middle portion of the band-shaped blade toward the torsion termination end thereof. Accordingly, the rake angle can be formed throughout the blade in consideration of the deformation of the blade due to residual stress. That is, the blade has a favorable cutting performance.

As described above, according to the present invention, the spiral cutter having a favorable cutting performance can be mass-produced. Further, a plurality of spiral grooves can be easily formed in the cavity by arranging blocks appropriately. Therefore, the molding die can be manufactured at a low cost.

BRIEF DESCRIPTION OF THE DRAWINGS

These and other objects and features of the present invention will become apparent from the following description taken in conjunction with the preferred embodiments thereof with reference to the accompanying drawings, in which

FIGS. 6 through 10 show a spiral cutter according to a second embodiment of the present invention, in which FIG. 6 is a front view and a left side elevation showing the spiral cutter;

FIG. 7 is a right side elevation of the spiral cutter;

FIG. 8 is a longitudinal sectional view showing the spiral cutter;

FIG. 9 is a front view showing a band-shaped blade;

FIGS. 10 is a longitudinal sectional view showing a molding die;

FIG. 39 is a longitudinal sectional view showing the spiral cutter;

FIG. 40 is a plan view showing the spiral cutter;

FIG. 41 is a side elevation showing the spiral cutter;

FIG. 42 is a partially enlarged sectional view of the spiral cutter as shown in FIG. 39;

FIG. 43 is a sectional view showing a molding die;

FIG. 44 is a plan view showing the molding die;

DETAILED DESCRIPTION OF THE INVENTION

Figure 1:
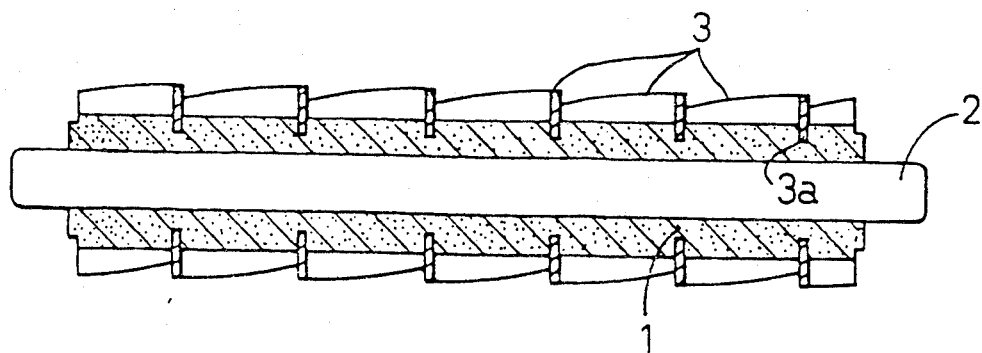
FIG. 1 is a longitudinal sectional view showing a spiral cutter according to a first embodiment of the present invention.
Figure 2:
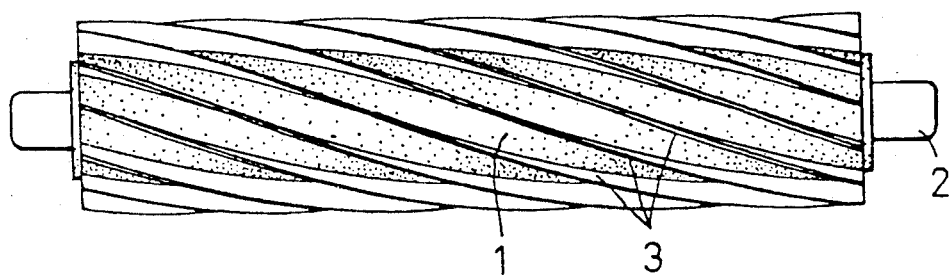
FIG. 2 is a front view of the spiral cutter.

Before the description of the present invention proceeds, it is to be noted that like parts are designated by like reference numerals throughout the accompanying drawings.

A first embodiment of the present invention will be described with reference to the accompanying drawings.

Referring to FIGS. 1 through 5, a spiral cutter according to the first embodiment of the present invention is described below.

With reference to FIGS. 1 though 3, a rotation shaft 2 made of a metal such as iron or stainless steel is molded in the center of an adiabatic layer 1 made of crystalline engineering plastic such as polybutadiene terephthalate or polyacetal by inserting the rotation shaft 2 into the adiabatic layer 1, and small band-shaped blades 3 made of a thin and deformable metal such as a stainless steel plate are molded into the peripheral surface of the adiabatic layer 1 by inserting the blade 3 into the adiabatic layer 1 with the blade twisted at a predetermined angle with respect to the axis of the rotation shaft 2. In this insert-molding, a base portion 3a of the blade 3 is embedded by a predetermined depth in the adiabatic layer 1 with the blade 3 having internal stress generated as a result of the application of torsional load to the blade 3 in a die.

Figure 4:
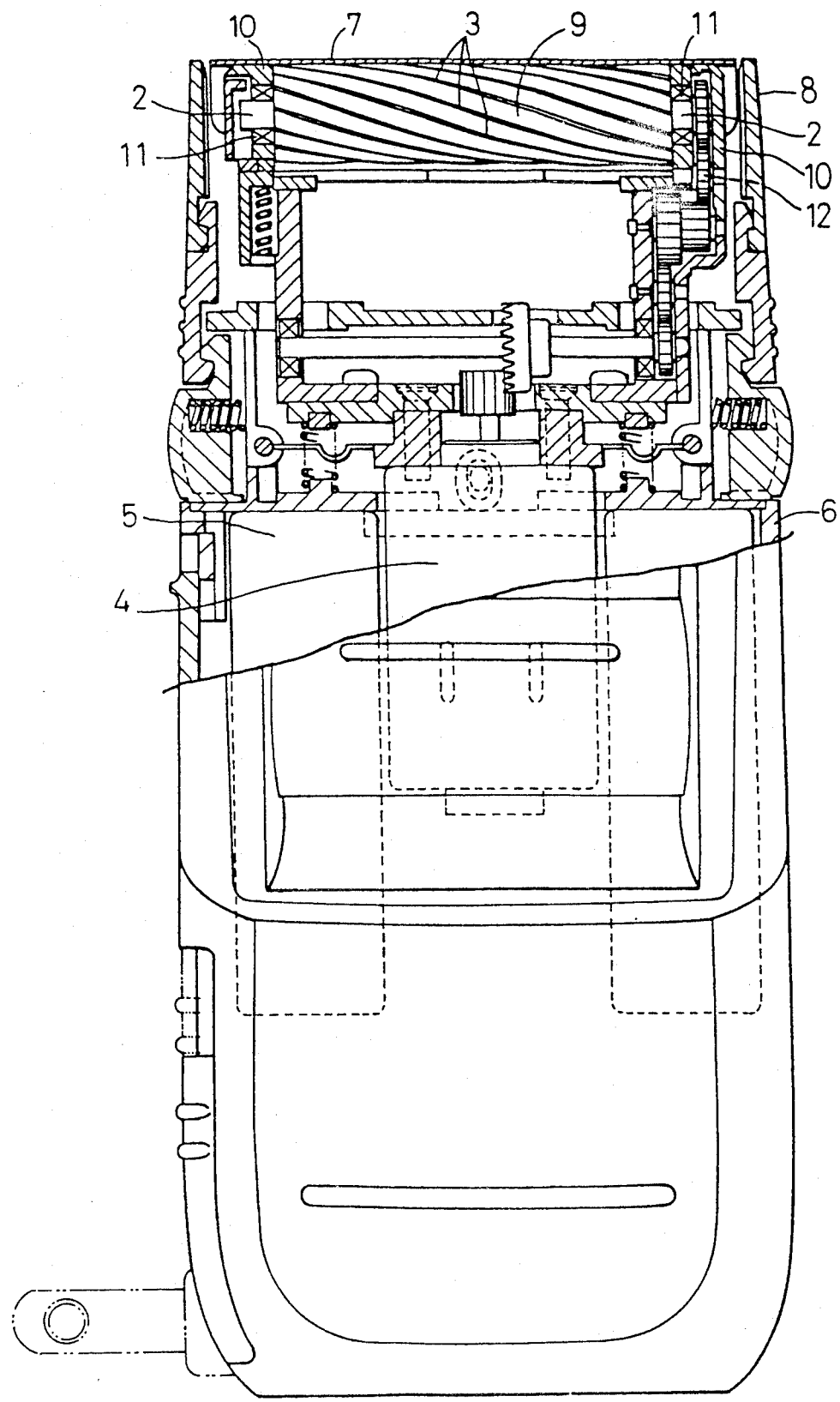
FIG. 4 is a partially sectional longitudinal view showing a rotary electric razor including the spiral cutter.

FIG. 4 shows the spiral cutter used as the internal blade 9 of a rotary electric razor.

In the electric razor, a fixed external blade 7 with a mesh is removably mounted by an external blade holder 8 above a main body casing 6 accommodating a motor 4 and a battery charger 5, and the internal blade 9 of the spiral cutter is rotatably supported to rotate in sliding contact with the inner surface of the external blade 7 by right and left bearing housings 10 and 10 projecting upward from the main body casing 6 via a bearing 11 such as a ball bearing or an oil containing bearing. One of the bearing housings 10 incorporates a multistage gear 12 for transmitting the rotation of the motor 4 to the internal blade 9.

Since the internal blade 9 comprises the adiabatic layer 1, consisting of polybutadiene terephthalate, interposed between the blade 3 and the rotation shaft 2 as described previously, frictional heat generated between gears 12 and between the rotation shaft 2 and the bearing 11 are not easily transmitted to the blade 3.

A comparison was made between a conventional rotary electric razor comprising an internal blade composing a spiral cutter machined from the steel previously described and a rotary electric razor comprising the internal blade composing the spiral cutter according to the embodiment of the present invention. The result is as follows:

The surface temperature of the fixed external blade 7 of the conventional razor was 22° C to 26° C. while that of the fixed external blade 7 of the razor according to the embodiment of the present invention was 14° to 18° C.

The internal blade 9 can be improved as follows by changing the density of the adiabatic layer 1 consisting of the synthetic resin.

The density of the adiabatic layer 1 is changed by changing the density of foaming in foaming molding method or multi-color molding the adiabatic layer 1 with two or more resins of different densities. For example, the adiabatic layer 1 is formed to be more dense near the rotation shaft 2 than distant from the rotation shaft 2. Thus, the weight of the internal blade 9 is made lighter. Since the density of the adiabatic layer 1 is greater near the rotation shaft 2 than distant from the rotation shaft 2, the mechanical strength of the adiabatic layer 1 near the rotation shaft 2 is great and the connecting strength between the adiabatic layer 1 and the rotation shaft 2 is superior.

Contrary to the above, the force for holding the base (or base portion) 3a of the blade 3 can be increased by making the density of the adiabatic layer 1 near the blade 3 greater than the density thereof from the balance. In addition, in this case, inertia force is increased when the rotation shaft 2 is rotating at a high speed and as such, the cutting edge of the blade 3 is better capable of cutting a mustache (i.e. as if the blade 3 was sharper).

It is favorable to impregnate a foaming resin having continuous pores with perfume to prevent a bad smell during shaving. The foaming resin may be impregnated with a chemical instead of perfume so as to restrain the propagation of bacteria in the adiabatic layer 1. Synthetic resin may contain antibacterial zeolite powder or copper ions.

Figure 3:
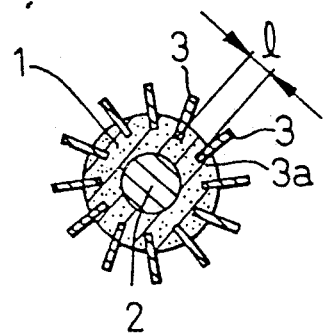
FIG. 3 is a side elevation of the spiral cutter.

In order to increase the strength of the adiabatic layer 1, the synthetic resin may contain glass fibers or shavings or fibers of a metal such as stainless steel. The heat-resistant performance of the adiabatic layer 1 formed as above can be improved. For example, polybutadiene terephthalate along softens at 100° to 120° C. while a mixture of polybutadiene terephthalate and glass fiber is heat-resistant up to 170° C. Preferably, the interval (1) between the adjacent small blades 3 and 3 as shown in FIG. 3 is selected as the length of each fiber. More specifically, preferably, the interval (1) is the distance between the intersections of the peripheral surface of the adiabatic layer 1 and the base 3a of the adjacent blades 3.

The tone quality of an electric razor can be improved by composing the adiabatic layer 1 of the synthetic resin.

Figure 5:
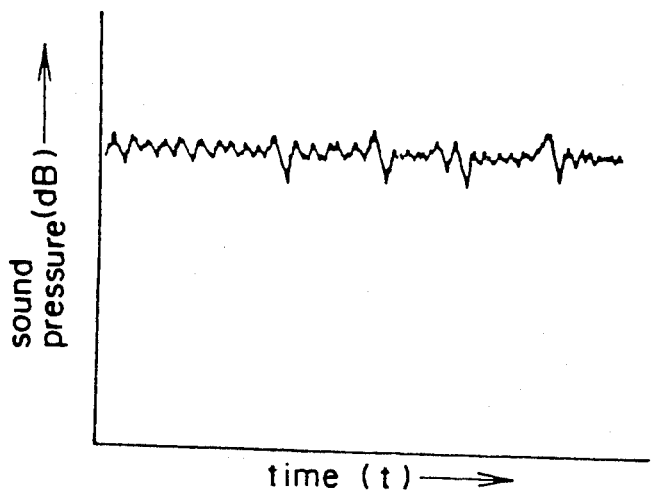
FIG. 5 is a view depicting a sound generated by the sliding contact between an internal blade composing the spiral cutter and a fixed external blade.

With the conventional rotary electric razor in which the internal blade is machined from the steel previously described steel, when the mustache is cut, the cutting edge hardly flexes and no sound is generated because the cutting edge of the small blade does not vibrate. Therefore, a user does not feel that the mustache has been cut although it has been actually cut. However, in a reciprocating type electric razor as shown in, for example, Japanese Patent Laid-Open Publication No. 61-50588, the circular-arc internal small blade is fixed to the base without being deformed. Therefore, the internal small blade makes a chattering noise, which is harsh to the ear. FIG. 5 depicts the sound generated by the friction between the internal small blade and the fixed external blade of the reciprocating type electric razor.

On the other hand, according to the construction of the razor of the present invention to which the torsionally deformed base 3a of the blade 3 in the axial direction of the rotation shaft 2 is fixed in the peripheral surface of the adiabatic layer 1 made of synthetic resin, the blade 3 is resilient such that it can return to its original linear configuration. Therefore, the blade 3 does not flex easily in cutting the mustache, so that the cutting operation of the blade 3 is superior. In addition, as shown in FIG. 5 which depicts the sound generated by the friction between the internal blade 3 and the fixed external blade 7, a peak in FIG. 5 is lower than the peak, and the razor does not chatter and mainly generates a high sound (800 to 1500 Hz). Hence, a pleasant sound is generated.

That is, the blade 3 generates a comparatively high sound as described above. Low sounds (60 to 200 Hz) one absorbed by the adiabatic layer 1 consisting of the synthetic resin which is soft while high sounds remain, due to a filtering operation. Thus, a pleasant sound is generated.

According to the first embodiment, the blade 3 is embedded in the adiabatic layer 1 with the torsional angle of the blade 3 set to 18° so as to obtain resilience. The greater a torsional angle is, the larger the resiliency is. Therefore, if a torsional angle is great, a shock applied to the blade 3 may cause it to be broken. If the torsional angle is to be as great as 30°, the torsional angle of the blade 3 is formed to be 10° to 20° by an advance pressing operation, and then the blade 3 is subjected to a plastic deformation. Then, it is fixedly embedded in the adiabatic layer 1. Thus, the residual resilience of the blade 3 is reduced to that obtained when the torsional angle is 10° to 20°.

The following advantage can be obtained by embedding the base 3a of the blade 3 in the adiabatic layer 1 when the base 3a is resilient:

In the conventional rotary electric razor in which the internal blade includes a spiral cutter machined from the previously described steel sounds generated by the gear 12 and vibration sounds of the motor 4 are transmitted to the internal blade via the rotation shaft 2 and radiated from the fin-shaped cutting edge. Thus, a noise is made.

According to the first embodiment, the adiabatic layer 1 is made of synthetic resin and the blade 3 is fixedly embedded in the adiabatic layer 1 with the blade 3 resilient in the axial direction of the rotation shaft 2. Accordingly, the adiabatic layer 1 absorbs sounds and the vibration of the blade 3 is greatly prevented. That is, the adiabatic layer 1 absorbs sounds generated by the gear 12 and the vibration sounds generated by the motor 4 in the bearing housing 10, thus preventing the propagation of sounds from the cutting edge of the blade 3 to the outside. Thus, a quiet sound is generated.

According to the first embodiment, the blade 3 is inserted into the adiabatic layer 1 made of the synthetic resin. But instead, the base 3a of the blade 3 made of thin twistable stainless steel may be fixedly inserted into the spiral groove formed on the peripheral surface of the adiabatic layer 1.

Further, the base 3a of the blade 3 may be fixedly inserted via the adiabatic layer into a spiral groove formed on a large diameter portion of the surface of the metallic rotation shaft 2. In this situation, the diameter portion is formed on the rotation shaft 2 except at both end surfaces thereof which are supported by the bearings.

According to the first embodiment, neither the frictional heat between the rotation shaft 2 and the bearing 11 nor the frictional heat between the gears 12 is transmitted to the blade 3 by the adiabatic layer 1 formed between the blade 2 and rotation shaft 2. Therefore, the performance of the blade 3 is not determined by heat and the small blade 3 is durable. The blade 3 used as the internal blade 9 of an electric razor prevents the surface temperature of the external blade 7 from rising, so that a user does not feel that the external blade 7 is hot in using the razor. In addition, even though the cutting edge of the blade 3 is hot, the adiabatic layer 1 prevents heat from being transmitted from the cutting edge to the bearing 11 supporting the rotating shaft 2. Therefore, the temperature rise of the bearing 11 can be prevented and as such the bearing 11 is durable.

Second Embodiment

Referring to FIGS. 6 and 7, a spiral cutter according to a second embodiment of the present invention is described below. The spiral cutter comprises a cylindrical pillar or a many-sided prism base 21 and a band-shaped blade 22. The base 21 consists of crystalline engineering plastics such as nylon, acetal, polyester, polyphenylene oxide, polycarbonate, polystyrene or PBT resin. These resins are used alone or contain glass fiber or metal shavings. The blade 22 comprises a plurality of thin stainless steel plates formed thereof, for example, as SUS 430J2 embedded in the peripheral surface of the base 21 with the blade 22 making a predetermined angle (torsional angle $\beta$) with a rotational shaft 23. The material of the base 21 is selected in consideration of a temperature to which the blade 22 will be subjected in operation of a necessary surface hardness (determined by anticipated shock). For example, preferably, in heat resistance and shock resistance, the material should be resistant to more than 100° C. and 6 kg.cm/cm, respectively.

The lower side end (or base portion) 22a of the blade 22 is embedded at a predetermined depth in the base 21 with the blade 22 having residual stress generated by twisting the blade 22 in the thickness direction thereof. In this case, a means such as through-holes or cut-outs for preventing the blade 22 from being removed from the base 21 is provided all through or partially along the lower end 22a. In this case, the size of the means is adjusted so as to avoid reducing the twisted deformation of the blade 22. To this end, preferably, the through-holes or cut-outs are all embedded in the base 21.

The rotation shaft 23 made of a metal such as iron or stainless steel projects from both end surfaces of the base 21.

The spiral cutter is manufactured as follows:

During injection molding of the base 21, the blade 22 and the rotation shaft 23 are inserted into the base 21.

Figure 10:
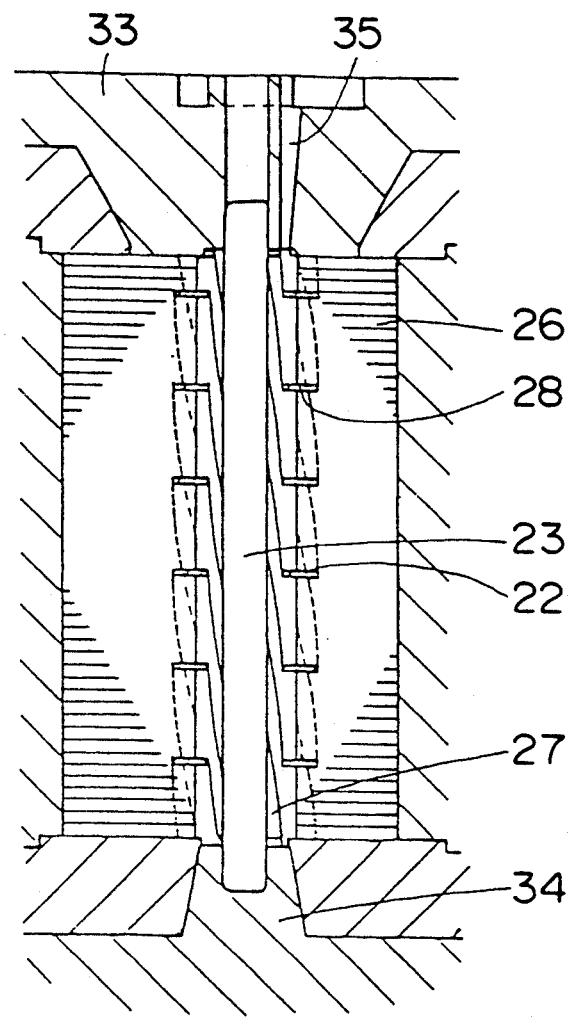
Figure 11:
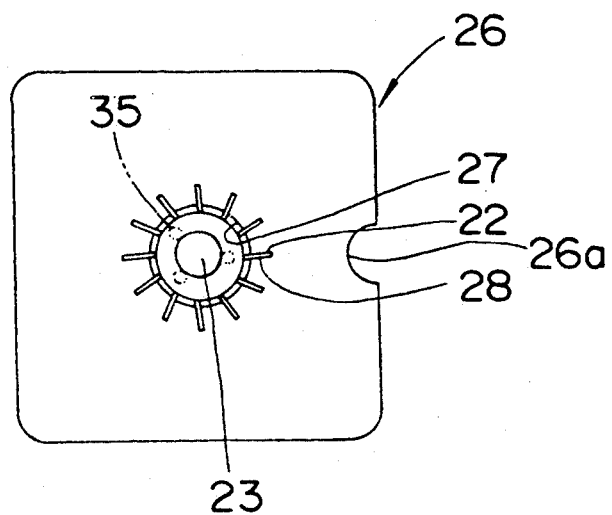
FIG. 11 is a plan view showing the molding die.

FIGS. 10 and 11 are sectional views showing the construction of a die 26 for molding the base 21. The die 26 comprises a cavity 27 corresponding to the base 21 provided in the center thereof and a plurality of spiral grooves 28 (12 pieces) into which the blade 22 is inserted with the blade 22 having residual stress generated by twisting. The grooves 28 are provided in the inner peripheral surface of the cavity 27.

Figure 13:
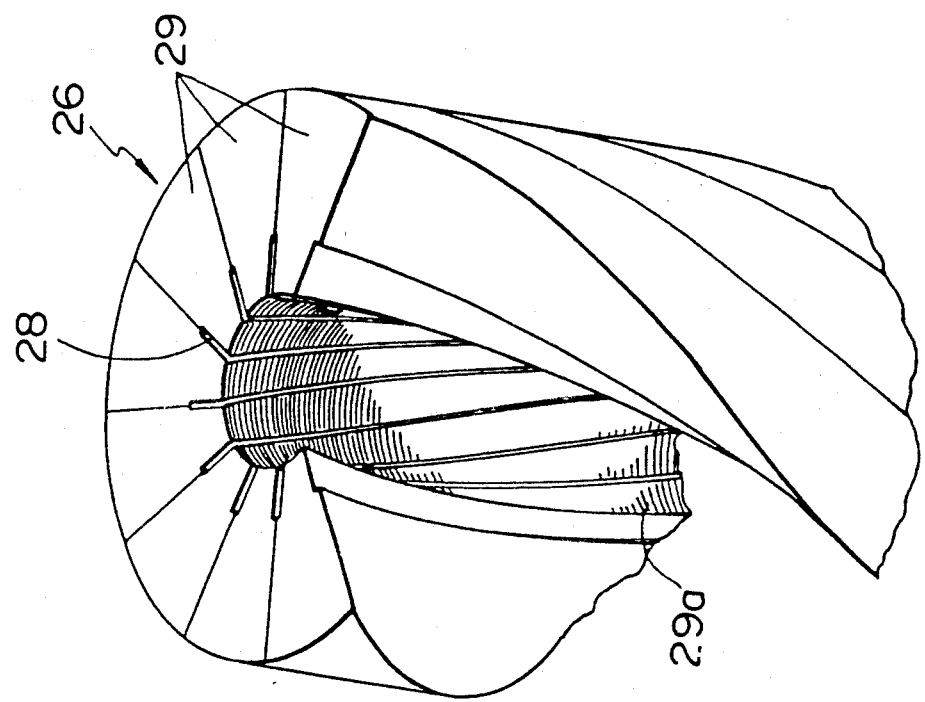
FIGS. 12 and 13 are perspective views showing a molding die, respectively.
Figure 12:
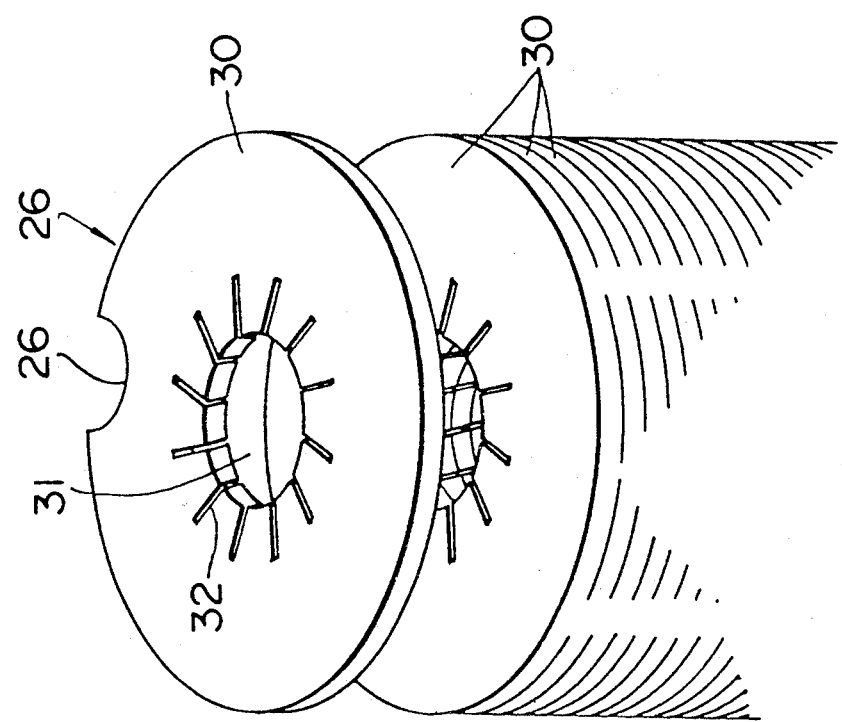

It is necessary to regulate the direction of the die 26 in mounting the die 26 on a molding frame. To this end, as shown in FIGS. 11 and 13, a cut-out 26a is formed on the wall of the die 26 in the axial direction thereof. The cut-out 26a is effective for re-connecting divided blocks 30, to be described later, with the die 26 for maintenance and repair without making a directional mistake. As shown in FIG. 12, the die 26 is assembled by layering a plurality of blocks 30 along on axially direction without a gap being provided between adjacent blocks 30. Each block 30 is formed by dividing the polygonal or circular die 26 in the axial direction thereof uniformly or nonuniformly and has a circular opening 31 which forms the cavity 27 in the center thereof. Slits 32 which form the spiral groove 28 are formed radially outwardly from the inner peripheral surface of the opening 31. All the blocks 30 are layered. As a result, the openings 31 of the blocks 30 communicate with each other to form the cavity 27. The direction of the slits 32 of the blocks 30 are offset a certain amount from one another so that the slits 32 conform to the curve of the spiral groove 28. The spiral groove 28 is formed in the inner periphery of the cavity 27 by layering all the blocks 30.

For example, supposing that the shaft length of the base of the spiral cutter is 40 mm, the spiral cutter comprises 40 blocks 30 of 1 mm thickness piled one on the other.

As shown in FIG. 13, the die 26 may comprise a plurality of blocks 29 divided equally in the circumferential direction of the die 26. The lines which divide the blocks 29 conform to the spirality of the spiral grooves 28.

In this case, circumferential lines 29a may be formed on the inner surface of the block 29 to form fine irregularities, intersecting the direction in which the blade 22 is embedded, on the surface of the base 21 which is to be molded. This construction allows cut waste to move on the base 21 along the blade 22, thus preventing cut waste from piling concentrically on one end of the blade 22.

In molding the spiral cutter by using the die 26, the blade 22 is inserted downwardly into the die 26 from a position above the cavity 27 and then, the upper end (or outer portion) 22b of the blade 22 is inserted into the spiral groove 28. Torsional load is applied to the blade 22 inserted into the spiral groove 28 with the blade 22 making a predetermined torsional angle, for example, 18° in the spiral groove 28 and as such having torsional stress. As a result, the lower end 22a of the blade 22 projects into the cavity 27.

The rotation shaft 23, having convex and concaves portions, formed on the peripheral surface thereof, for preventing rotation of the base 21, is provided in the center of the cavity 27. The upper and lower ends of the rotation shaft 23 are supported by a spool bushing 33 and a lower die 34 of the die 26 so as to hold the die 26 vertically. The rotation shaft 23 can be accurately provided in the die 26 by providing the convex and concave portions in the middle portion in the axial direction thereof.

Then, the base 21 is molded, the lower end 22a of the blade 22 is embedded in the base 21 to a predetermined depth, and the rotation shaft 23 is also embedded in the center of the base 21 by injecting molten resin from the gate 35 into the cavity 27.

Figure 9:
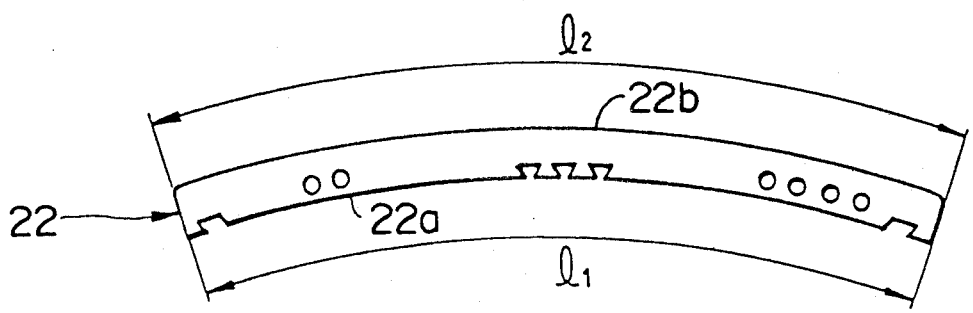

As shown in FIG. 9, the length $l_1$ of the circular-arc lower end (or base end) 22a of the blade 22 is set to be shorter than the length $l_2$ of the circular-arc upper end 22b. Thus, the lower end 22a can be embedded to a uniform depth in the base 21 throughout the axial direction of the base 21.

As shown in FIG. 11, favorably, a plurality of gates 35 is formed on one end face of the base 21, for example, between the lower end 22a and the rotation shaft 23, and more favorably, at positions as near as possible to the rotation shaft 23. Thus, pressure to be used in injection the resin prevents the blade 22 from being forced out of the spiral groove 28 into the cavity 27 or from being torsionally inclined. In addition, the gate 35 may be provided on the end face of the base 21 in the form of a film (or gap) along the periphery thereof.

The gates 35 are provided on the end face of the base 21 at plural positions, each of which is between extended lines of the lower end 22a of adjacent blades 22. As a result, the melted resin flows along the spiral blade 22, thus being charged into the die 26. The resin reduces the residual stress of the molded base 21. For example, as shown in FIG. 11, three gates 35 are provided at unequal intervals. Thus, even if one end of each of the uniformly arranged blades 22 coincides with one gate 35, it does not coincides with the other gates 35. Therefore, the blades 22 can be injection-molded without deforming then beyond a predetermined extent.

After the melted resin is hardened, the spool bushing 33 is removed from the die 26 and then, the produced spiral cutter is removed from the die 26 by rotating it upward along the spiral groove 28.

Figure 8:
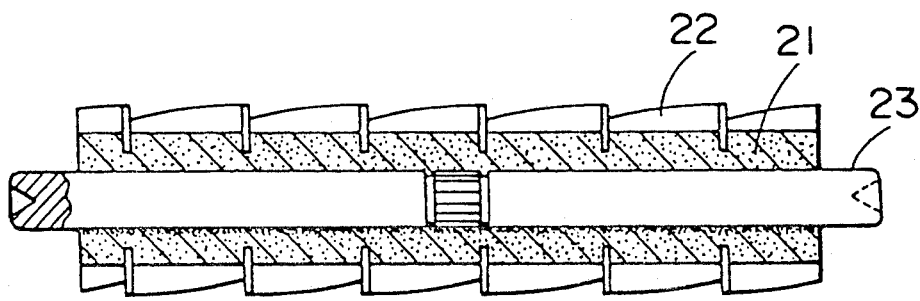

Finally, the upper end 22b of each of the blades 22 is ground by cylindrical grinding in the direction opposite to the rotational direction (X) of the rotation shaft 23 as shown in FIG. 7 so that no burrs are not formed in the direction of a rake angle. In order to facilitate a grinding operation, both end faces of the rotation shaft 23 are conical as shown in FIG. 8.

In order to facilitate cutting, preferably, the blade 22 has a rake angle $\alpha$ of, for example, 5°.

In order for the blade 22 to have the rake angle $\alpha$, it is necessary to form the spiral groove 28 of the die 26 at an angle $\gamma$, corresponding to $\alpha$.

If the angle $\gamma$ is formed uniformly throughout the spiral groove 28, the following disadvantages occur:

When the blade 22 is inserted in the spiral groove 28 of the die 26, torsional load is applied to the blade 22. As a result, internal stress is generated. Therefore, after the molded product is taken out from the die 26, the blade 22 is deformed by the internal stress, so that the rake angle $\alpha$ cannot be formed throughout the blade 22. That is, there is hardly a deformation caused by the internal stress of the blade 22 in the middle portion of the blade 22 in the longitudinal direction thereof. But the blade 22 is deformed as shown by a broken line (a) in FIG. 14 in a negative direction, namely, in the direction opposite to the twist direction from the middle portion of the blade 22 toward the twist start portion (A) (gate 15 side) thereof, and deformed gradually in a positive direction, namely, in the twist direction as shown by a broken line (b) of FIG. 14 from the middle portion thereof toward the twist termination portion (B) thereof.

Figure 14:
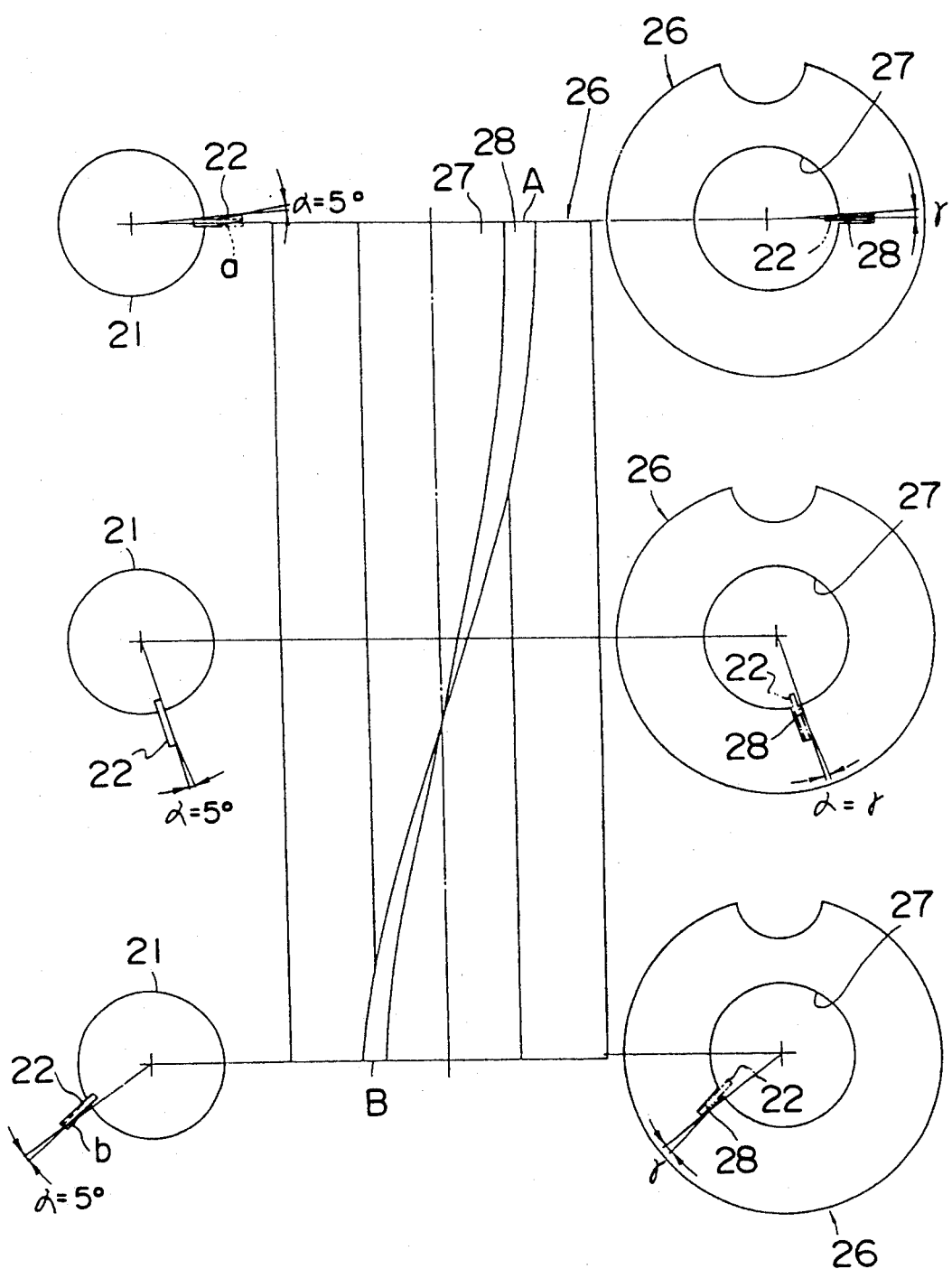
FIG. 14 is a descriptive view showing the change of the angle of a spiral groove which holds the torsion starting end, torsion middle portion, and torsion terminating end of the band-shaped blade.

In consideration of the deformation due to the internal stress of the blade 22, the angle $\gamma$ at which the spiral groove 28 is to be formed is set as follows:

That is, as shown in FIG. 14, the angle $\gamma$ in the middle portion of the spiral groove 28 is set to be equal to the rake angle $\alpha$ and gradually reduced from the middle portion thereof to the twist start end (A) thereof and gradually increased toward the twist termination end (B) thereof.

On the contrary, the blade can be easily adapted to have its spiral configuration with a rake angle close to the rake angle $\alpha$ formed by plastic deformation in advance of being inseted in the spiral groove 28 of the die 26. With such a deformation of spiral configuration, it is easy for the blade to be inserted into the spiral groove of the die without causing any stress within the blade.

Thus, the rake angle $\alpha$ can be formed throughout the blade 22.

Figure 15:
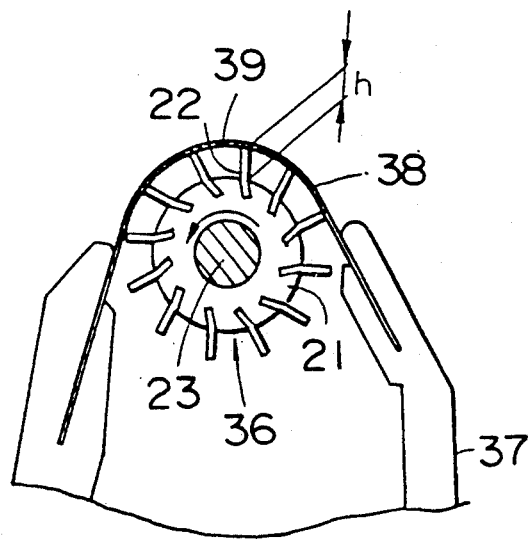
FIG. 15 is a longitudinal sectional view showing an electric razor including the spiral cutter.
Figure 16:
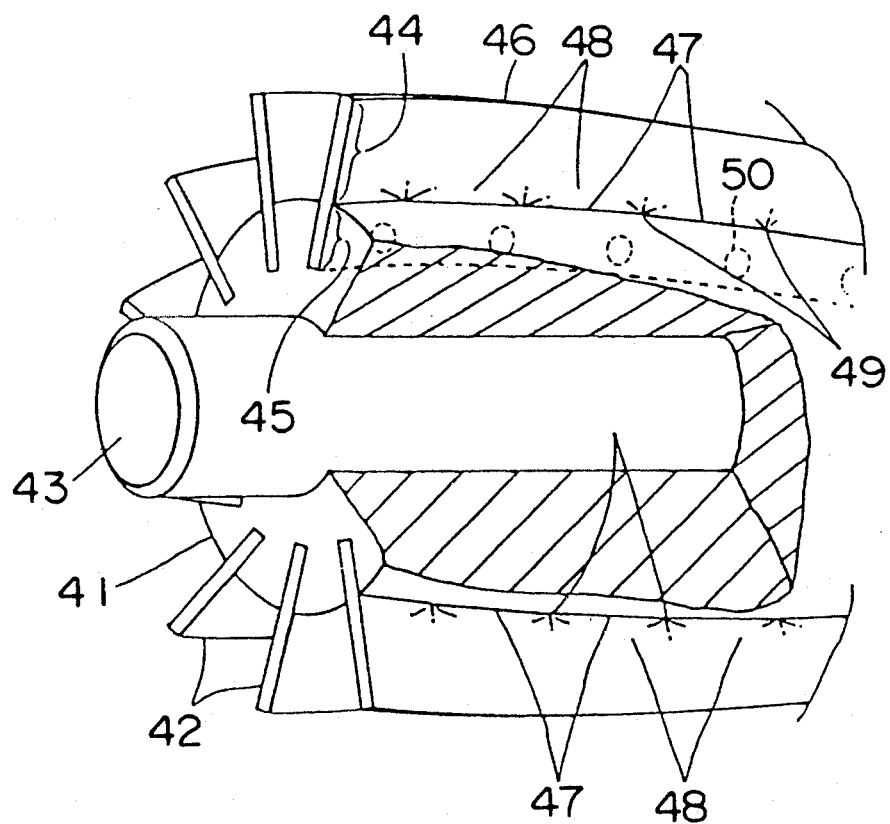
FIG. 16 is a partial cut-away perspective view showing a spiral cutter according to a third embodiment of the present invention.
Figure 17:
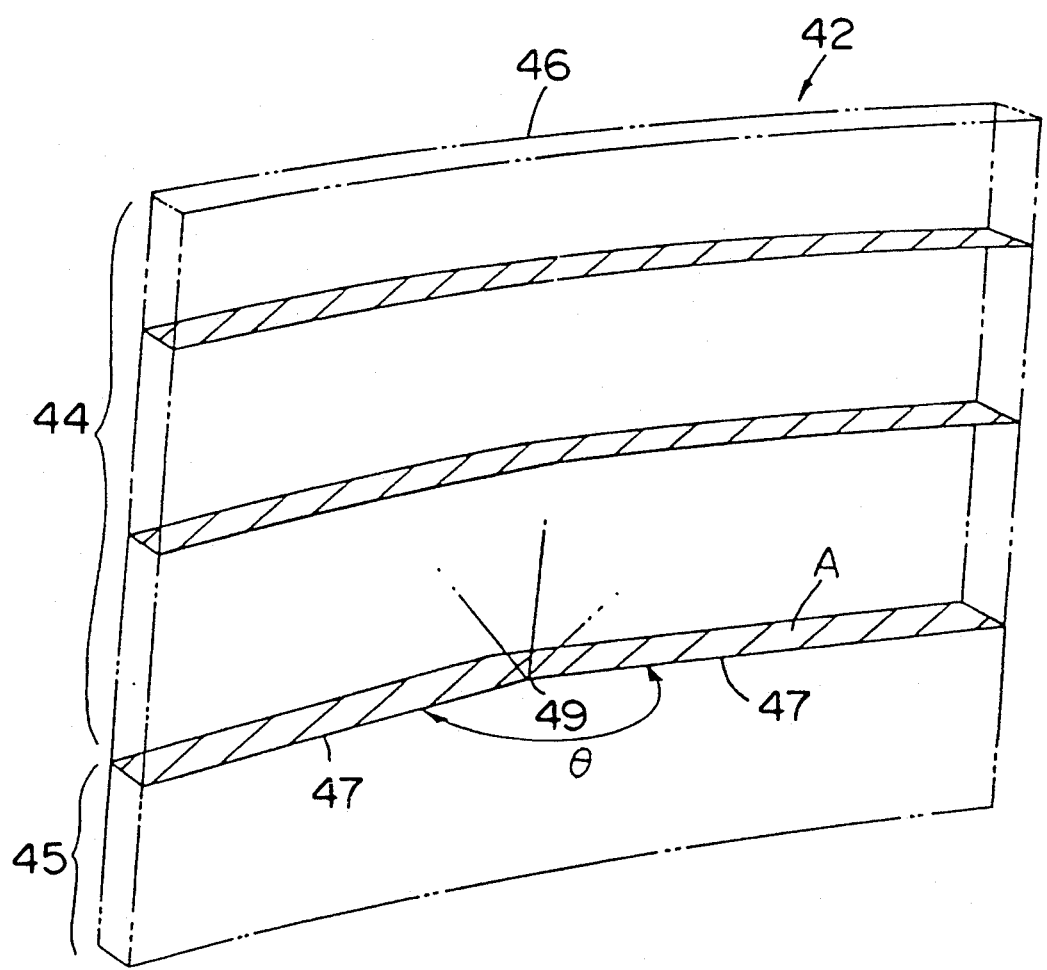
FIG. 17 is a descriptive view showing a sectional configuration of a part of the spiral cutter.

FIG. 15 shows an electric razor in which a spiral cutter is used as an internal blade.

The electric razor comprises a fixed external mesh blade 38 mounted on the upper portion of a main body casing 37 and an internal blade 36, formed by a spiral blade, which rotates in sliding contact with the internal surface of the fixed external blade 38. The internal blade 36 is rotatably supported about the rotation shaft 23.

Since the internal blade 36 is embedded in the base 21 by twisting it, the blade 22 has a twist stress tending to return it to its original linear configuration. Therefore, even though the blade 22 is as thin as approximately 0.1 mm so that the blade is twistable or the height (h) of the base 21 is large to prevent the cut mustache from being blown out, the blade 22 is not easily flexed. Thus, the blade 22 is capable of cleanly cutting the mustache.

In molding the blade 22 by inserting it into the base 21, instead of injection molding with plastic, die casting may be employed with a molten metal such as an aluminum alloy.

It is possible to integrate the rotation shaft 23 with the base 21 in order to prevent the eccentric dislocation of the base 21 with respect to the rotation shaft 23.

The blade 22 embedded in the base 21 is given a twist stress by setting the torsional angle $\beta$ of the blade 22 to 18°. The greater the torsional angle $\beta$ is, the stronger twist stress is, the blade 22 may be broken by a shock applied thereto. If the torsional angle is to be as great as 30° to 45°, the torsional angle of the blade 22 is set at 10° to 20° by pressing operation, then the blade is subjected to a plastic deformation. Then, it is fixedly embedded in the base 21. Thus, the residual resilience of the blade 22 is reduced to that obtained when the torsional angle is 10° to 20°.

Third Embodiment

Figure 18:
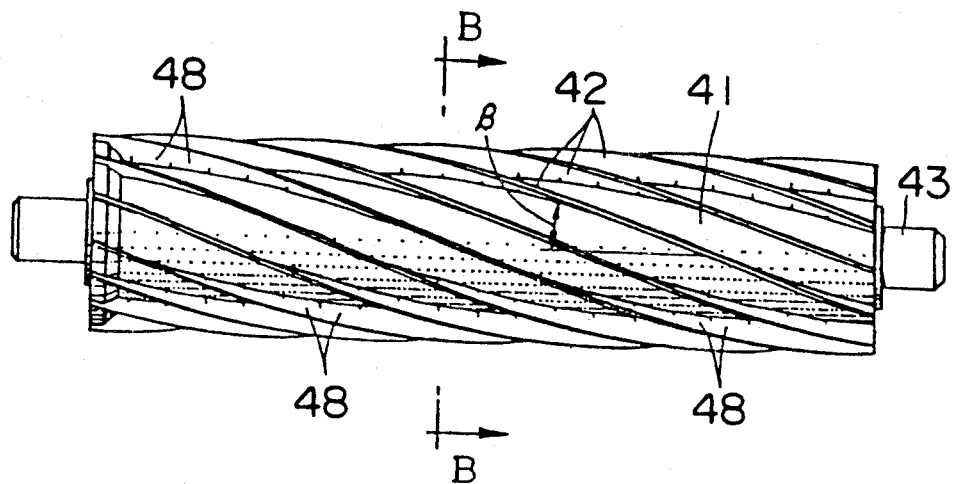
FIG. 18 is a front view showing the spiral cutter.

Referring to FIGS. 16 through 19, a third embodiment of the present invention is described below. Referring to FIG. 18, a spiral cutter according to the third embodiment is molded by inserting a plurality of small spiral blades 42 in the peripheral surface of a cylindrical base 41 made of plastic with the blades 42 twisted at a certain angle. Each blade 42 comprises an upper wall 44 projecting from the peripheral surface of the base 41 and a lower wall (or base end) 45 embedded in the base 41. Openings 50 are formed in the lower wall 45 throughout all of part of its length at predetermined intervals so that the lower wall 45 can not be removed from the base 41. A rotation shaft 43 projects from the center of both end faces of the base 41. The rotation shaft 43 is insert-molded simultaneously with the blade 42.

The blade 42 is formed by punching a thin stainless steel plate in a circular-arc configuration in advance. The upper wall 44 is inserted into a spiral groove, of a multiple-broken line configuration, provided along a cavity of a die for molding the base 41. The lower wall 45 is held by exposing it in the cavity. In this case, referring to FIG. 17, the blade 42 is bent when it is inserted into the spiral groove of the die and the boundary line between the upper wall 44 and the lower wall 45 is bent in a multiple-broken line configuration such that right side portions 47 of a predetermined length are connected with each other in the configuration of "<" (gable configuration) from one end thereof to the other end thereof in the spiral direction. The bending angle $\theta$ between adjacent right side portions 47 is smallest at the boundary line and increases toward the upper edge of the blade 42.

Figure 19:
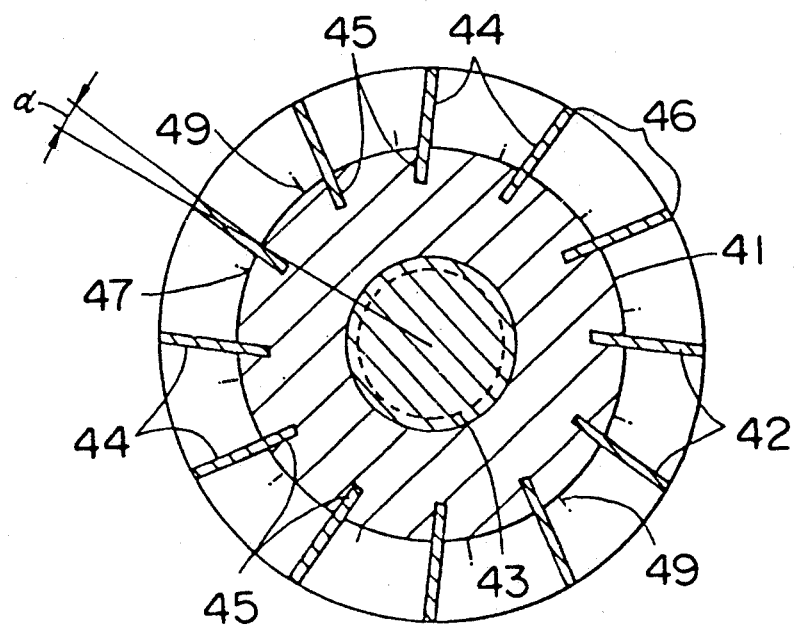
FIG. 19 is a sectional view taken along a line B—B of FIG. 18.

In order to obtain the spiral cutter, all blades are mounted in the die and the rotation shaft 43 is held in the cavity. Then, melted resin is injected into the cavity. Thus, the base 41 is molded, and the blade 42 and the rotation shaft 43 are embedded in the base 41 simultaneously with the blade 42 having a predetermined rake angle $\alpha$ as shown in FIG. 19 and a predetermined torsional angle $\beta$. The blade 42 is mounted in the die with the blade 42 elastically deformed. After the blade 42 is taken out from the die, it returns to its original state. Thus, the rake angle $\alpha$ is formed. The torsional angle $\beta$ is determined by the spiral groove of the die.

A desired cutting angle can be obtained by forming a relief angle on the edge 46 of the blade 42 having the rake angle $\alpha$ formed thereon by cylindrical grinding after the molding is completed.

Figure 20:
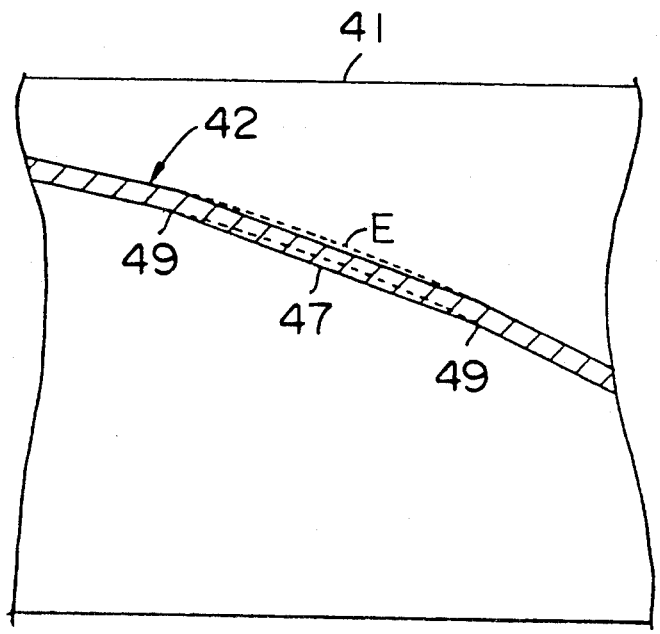
FIG. 20 is a sectional view showing a right side wall of the spiral blade.

The above spiral cutter is used as the internal blade of an electric razor. Supposing that the round diameter of the blade end 42 is 10 mm and the length of the base 41 in the axial direction thereof is 40 mm, the length of the interval between the adjacent bending points 49 and 49 is 2 mm and the length of the upper wall 44 is 1.2 mm. The blade 42 is 0.1 mm thick. The torsional angle $\beta$ of the blade 42 is 10° to 20°, and more favorably, 18°. The rake angle $\alpha$ is 3° to 10°, and more favorably, 5°. As shown by broken lines (E) in FIG. 20, the central portion between the adjacent bending points 49 and 49 of the right side wall 47 may be curved outward in an amount (60 $\mu$m) smaller than the thickness of the blade 42, assuming that the thickness of the blade 42 is 0.1 mm. In this case, each bending point 49 is flexed at a force of approximately 150 g.

Figure 21:
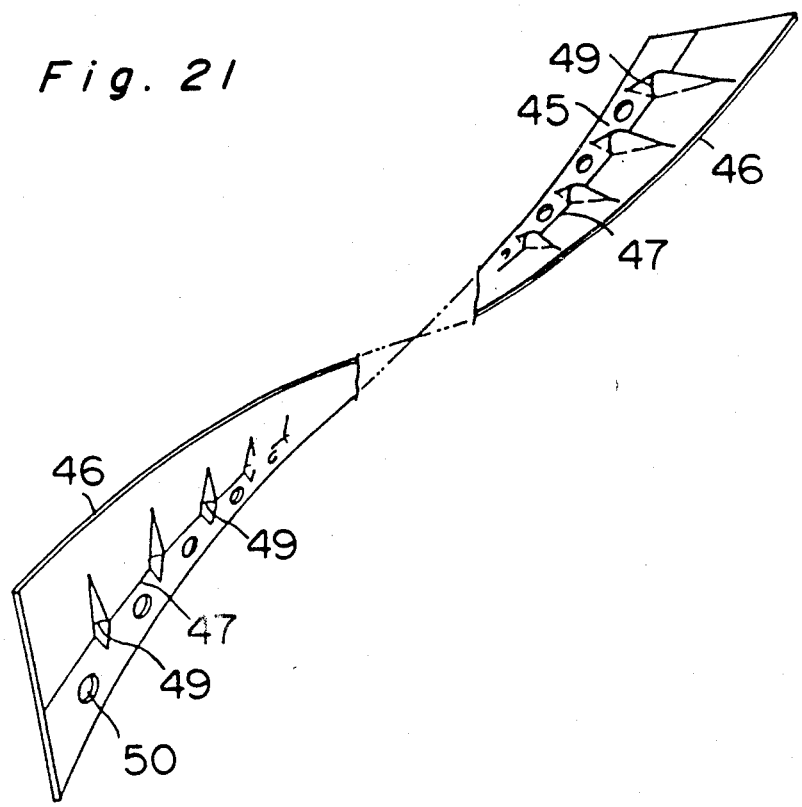
FIG. 21 is a perspective view showing a part of a spiral blade according to another example of the embodiment.

The bending point 49 is not limited to a point, but may be formed as shown in FIG. 21, i.e., it may have a width or a surface with a certain area or a bulged configuration. The interval between the bending points 49 and 49 can be linear by utilizing the difference between the length of the edge 46 and the length thereof which has become shorter by the amount of the reduction of the interval between the bending points 49 and 49 due to the formation of the above-described bulged configuration.

Figure 22:
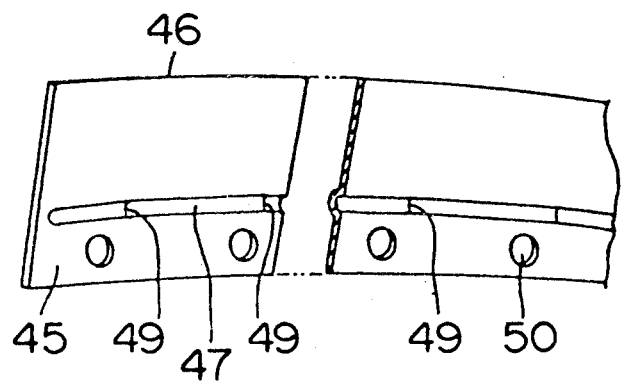
FIG. 22 is a perspective view showing a part of a spiral blade according to still another example of the embodiment.

In addition, as shown in FIG. 22, it is possible to form the right side wall 47 in the form of a multiple-broken line configuration by bending a linear rib by a pressing operation.

As described above, the upper wall 44 of the blade 42 is entirely twisted and the boundary line between the lower wall 45 and the upper wall 44 is bent in a multiple-broken line configuration. Thus, a second moment of area can be increased. Therefore, a great stress can be created not only for shear resistance (bending load) acting on the edge 46, but also for centripetal external force (buckling load) acting thereon.

In the third embodiment, in the insert-molding, the boundary line between the upper wall 44 and the lower wall 45 is bent in a multiple-broken line configuration by holding the blade 42 in the die. In addition, it is possible to punch the blade 42 from a plate and bend the boundary line in a multiple-broken line configuration by a pressing operation.

In molding the blade 42 by embedding it into the base 41, instead of injection molding with plastic, die casting may be employed with a molten metal such as zinc or an aluminum alloy.

Fourth Embodiment

A fourth embodiment according to the present invention is described with reference to FIGS. 23 through 28. A spiral cutter of the fourth embodiment is molded by surface of a cylindrical base 51 made of plastic with the blade 52 twisted at a certain angle. A rotation shaft 54 projecting from the center of both end faces of the base 51 is insert-molded simultaneously with the blade 52. The sizes of the base 51 are as follows: the diameter is 7.6 mm and the length in its axial direction is 40 mm. The blade 52 is made of a band-shaped thin stainless steel plate, for example, 13 chrome steel plates in the thickness of 0.1 mm. The number of the blades 52 used is 12. The torsional angle $\beta$ of the blade 52 is 10° to 20°, and more favorably, 18°. The rake angle $\alpha$ thereof is 3° to 10°, and more favorably, 5°.

A flange 53 to fill the gap between the adjacent blades 52 is formed integrally with the base 51 at one end thereof. The adjacent flanges 53 sandwiching the end portion of the blade 52 prevent the blade 52 from falling and the rake angle from being changed.

Figure 23:
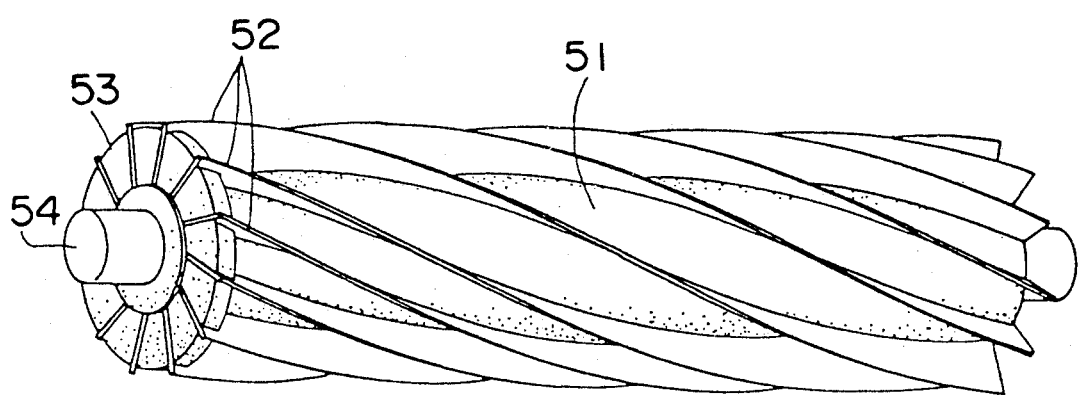
FIG. 23 is a perspective view showing a spiral cutter according to a fourth embodiment of the present invention.
Figure 26:
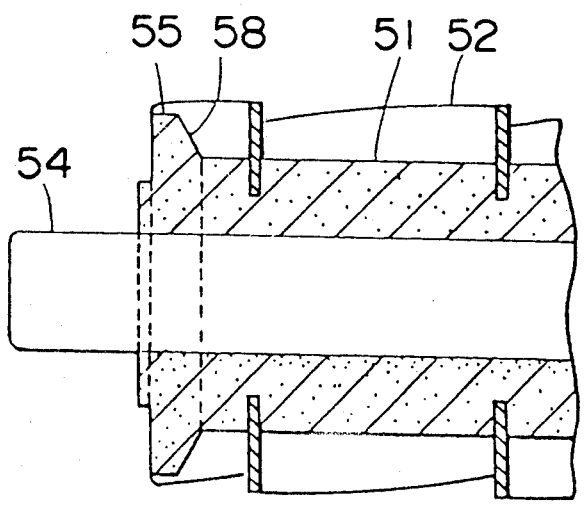
FIG. 26 is a sectional view showing an end portion of the spiral cutter.

Referring to FIG. 23, the round diameter of the blade end 52 is 10 mm; the diameter of the flange 53 is 9.6 mm; and the diameter of the base 51 is 7.6 mm as described previously. The blade 52 is 0.2 mm higher than the flange 53 so that the blade 52 is capable of cutting a mustache 0.15 mm thick at the end portion adjacent to the flange 53 without interference by the flange 53. As shown in FIG. 26, a taper portion 58 is formed on the flange 53 so that the sweep cut mustache hairs can be easily swept by a brush.

Figure 27:
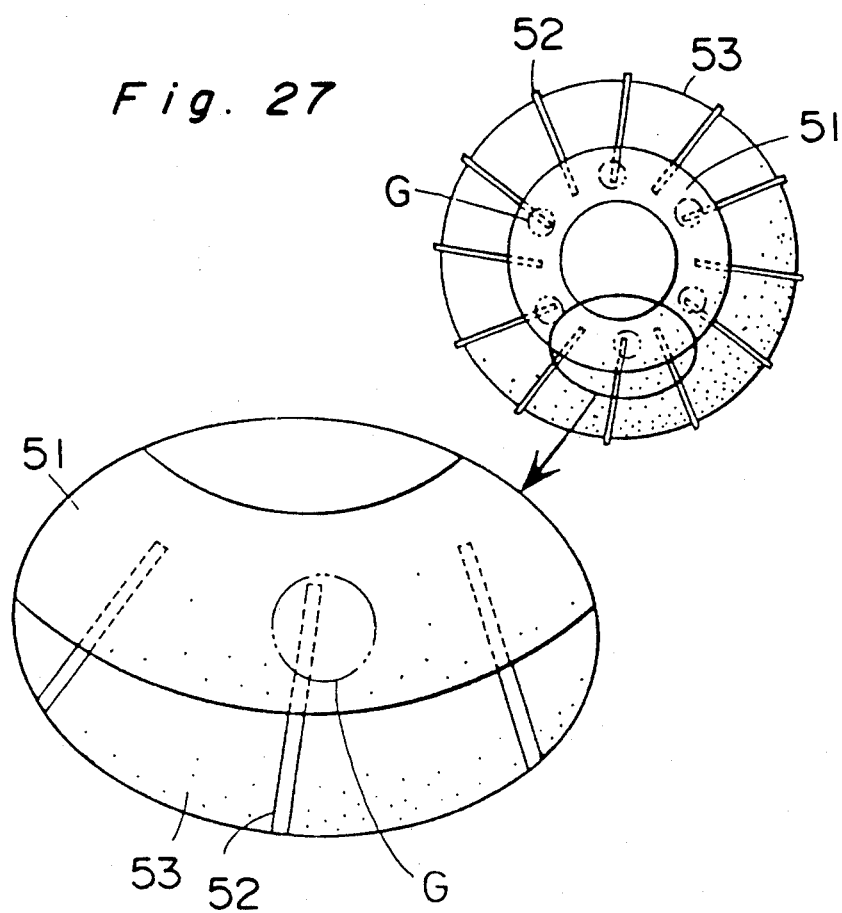
FIG. 27 is a view showing the relationship between the end face of the spiral cutter and gates.
Figure 28:
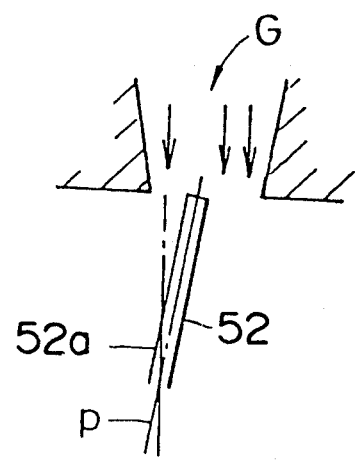
FIG. 28 is a view showing the position relationship between a spiral blade and a gate.

FIG. 27 shows the positions and the number of pinpoint gates (G) for insert-molding the spiral cutter. Six gates (G) are arranged at regular intervals for every other spiral blade at the end face of the base 51 on which the flanges 53 are provided. The lower end of the blade 52 is dislocated a little toward the left from the center of the gate (G). This is to prevent the blade 52, the base of which is positioned in the gate (G), from moving due to the pressure of the resin and to distribute the flow of the resin uniformly to the adjacent spiral blades 52. That is, as shown in FIG. 28, at the base portion of the blade 52, the axis (p) of the blade 52 inclines at an angle of approximately 10°. Therefore, the thrust pressure of the resin presses the rear surface 52a of the blade 52 and the rake angle $\alpha$ is likely to increase.

Figure 24:
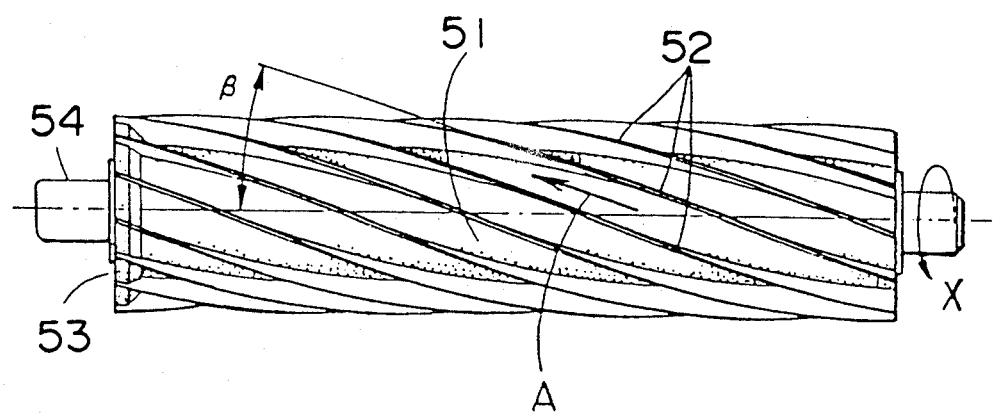
FIG. 24 is a front view showing the spiral cutter.
Figure 25:
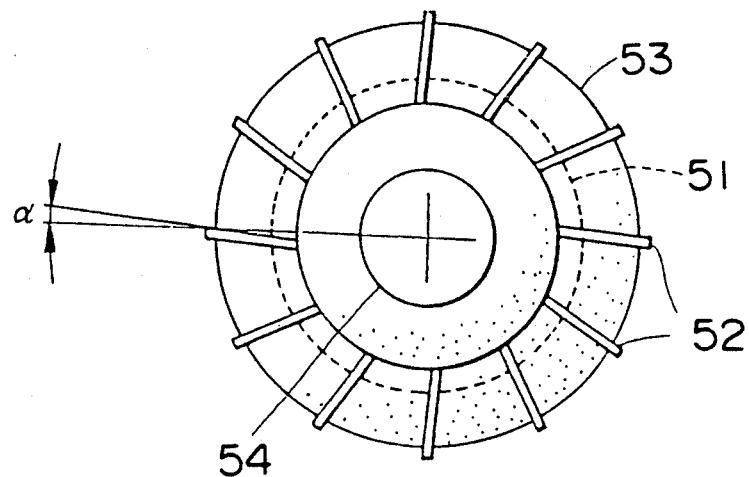
FIG. 25 is a side elevation showing the spiral cutter.

The result to be obtained when the spiral cutter is used as the internal blade of a rotary electric razor is described below. As shown in FIG. 24, the mustache is cut by the blade 52, rotating counterclockwise (X-direction) as seen from the driving device. At this time, the cut mustache hairs moves to the left as shown by an arrow (A) along the groove between the adjacent spiral blades 52 formed on the peripheral surface of the base 51. The flanges 53 provided on the left end of the base 51 prevents the cut mustache hairs from being discharged outside from the left end of the base 51. Therefore, the cut mustache does not penetrate into a bearing 57 positioned to the left of the base 51.

In cutting the mustache, even though the right end of the blade 52 is flexed by the sliding contact between the right end of the blade 52 and the fixed external blade 56 and by the cutting resistance of the mustache applied to the right end of the blade 52 and as a result, the deformation thus generated is transmitted to the left end of the blade 52, the flange 53 restrains the deformation. Therefore, the amount of resilient deformation at the left end of the blade 52 from the sliding contact region between the left end of the blade 52 and the external blade 56 is very small. Therefore, unlike the conventional electric razor, the external blade 56 is not broken due to the resilience of the left end of the blade 52.

In molding the blade 52 by inserting it into the base 51, instead of injection molding with plastic, die casting may be employed with a molten metal such as an aluminum alloy.

Figure 29:
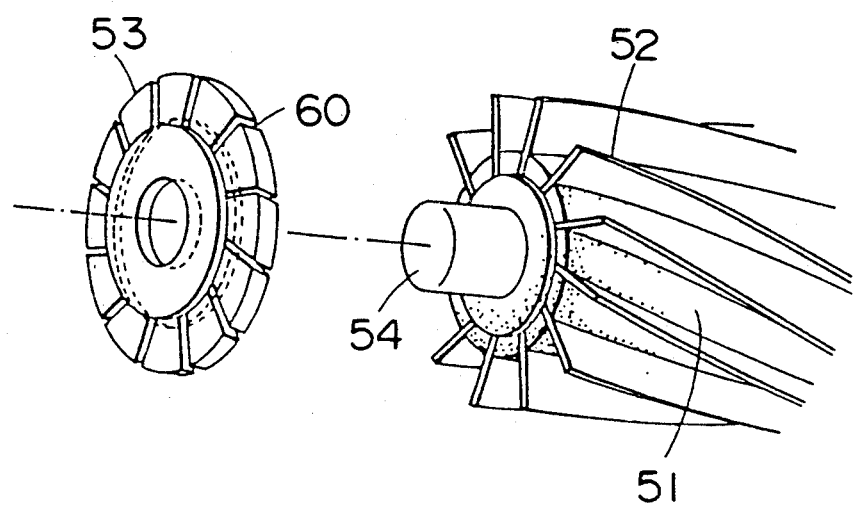
FIG. 29 is a perspective view showing the end portion of a spiral cutter and a flange according to another example of the embodiment.
Figure 30:
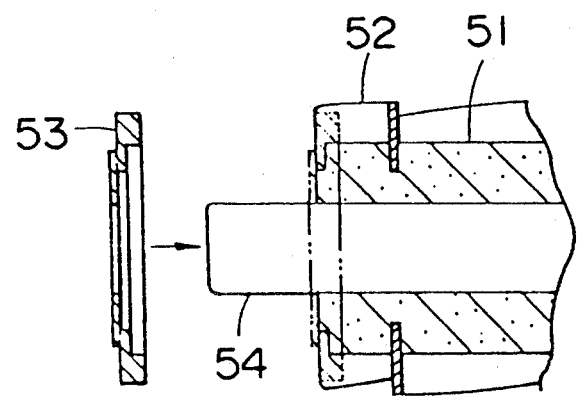
FIG. 30 is a sectional view showing the spiral cutter and the flange of FIG. 29.

The flange 53 may be formed separately from the base 51. For example, as shown in FIGS. 29 and 30, the flange 53 having slits 60 corresponding to the number of the blades 52 radially formed thereon is formed separately from the base 51 made of plastic or die casting alloy of aluminum or zinc, and the end portion of each blade 52 is fitted into each slit 60 with the flange 53 contacting the end face of the base 51. Thus, the flexure of the left end portion of the blade 52 is prevented. The end face of the base 51 and the flange 53 are adhered to each other or connected with each other by melting them. If the flange 53 is made of thermosetting plastic, it is unnecessary to form the slits 60. Rather, the flange 53 can be deformed and cut with the end of each blade 52 penetrating through the flange 53.

Figure 31:
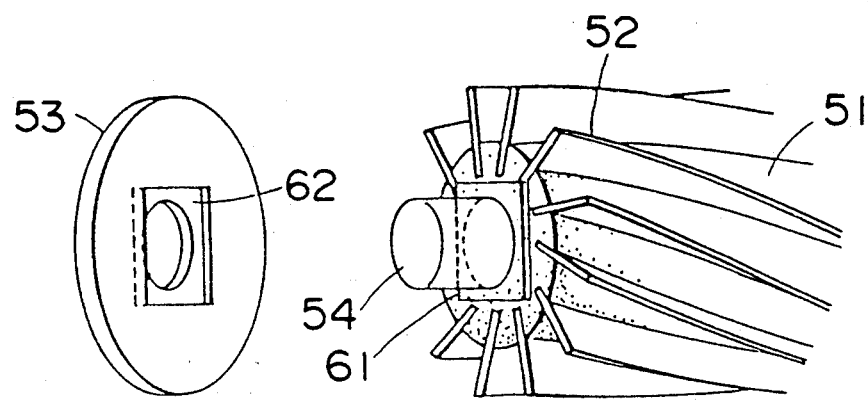
FIG. 31 is a perspective view showing the end portion of a spiral cutter and a flange according to a modification of the present invention.
Figure 32:
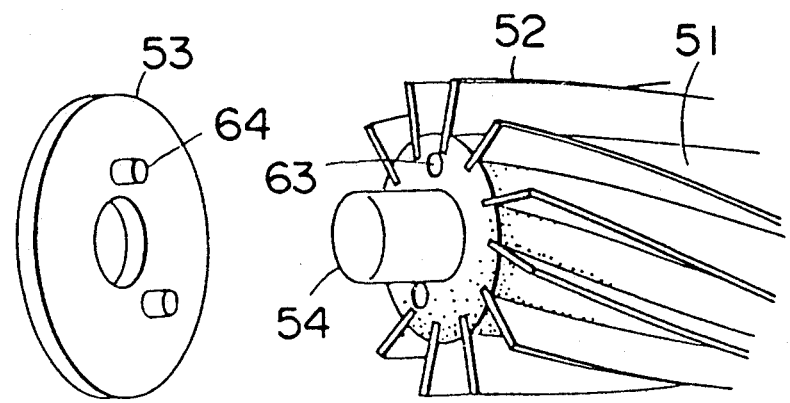
FIG. 32 is a perspective view showing the end portion of a spiral cutter and a flange according to another modification of the present invention.

In order to position the flange 53 on the end face of the base 51 and prevent the flange 53 from rotating thereon, as shown in FIG. 31, a rectangular projection 61 is formed on the end face of the base 51 such that the projection 61 surrounds the rotation shaft 54 and a recess 62 corresponding to the projection 61 is formed on the inner surface of the flange 53. Then, the projection 61 is fitted into the recess 62. Otherwise, as shown in FIG. 32, it is possible to form pins 64 on the inner surface of the flange 53 so that the pins 64 are fitted into recesses 63 which are provided at the eccentric positions outwardly from the rotation shaft 54, on the end face of the base 51.

Figure 33:
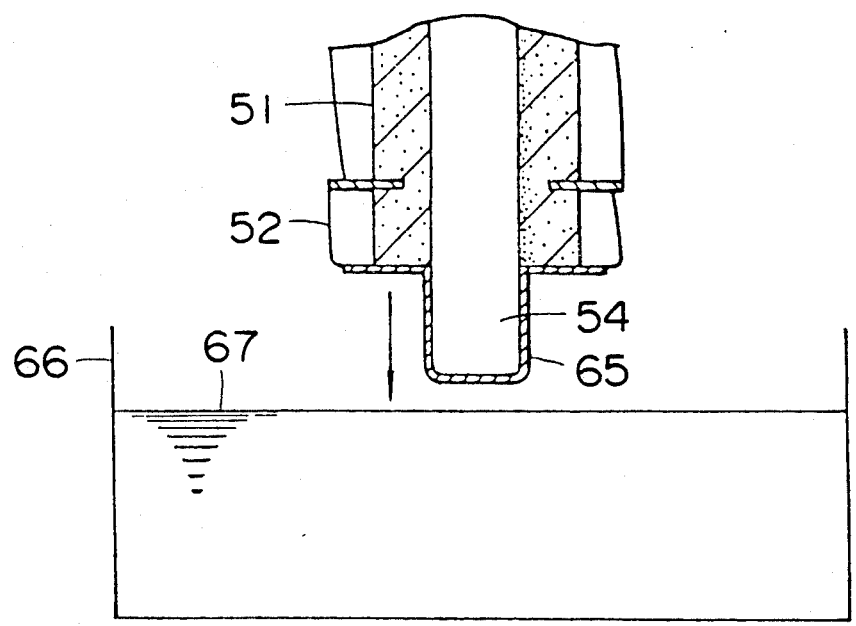
FIG. 33 is a sectional view showing a condition in which a flange is mounted on the end portion of a spiral cutter by immersing them in a solution according to still another modification of the present invention.
Figure 34:
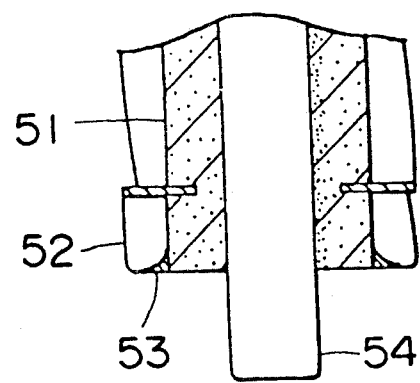
FIG. 34 is a sectional view showing the end portion of the spiral cutter obtained by the modification as shown in FIG. 33.

The flange 53 may be formed as follows: As shown in FIG. 33, a masking cap 65 covering the end face of the rotation shaft 54 and the base 51 is mounted on the end face of the base 51. A portion of the base 51, the rotation shaft 54, and the blade 52 are immersed in a solution 67 containing epoxy resin or the like contained in a bath 66 for a short period of time. When the dripping of the solution from the base 51 terminates, the solution applied thereto is dried so that the resin is hardened. Then, the masking cap 65 is removed therefrom. Thus, the flange 53 is integrated with the base 51 and the blade 52. Resin which is hardened by rays such as ultraviolet rays or electron beams is suitable for the solution 67. Resin attached to the masking cap 65 is appropriately hardened by radiating the masking cap 65 in a direction away from the blade 52 with the base 51 rotating.

Figure 35:
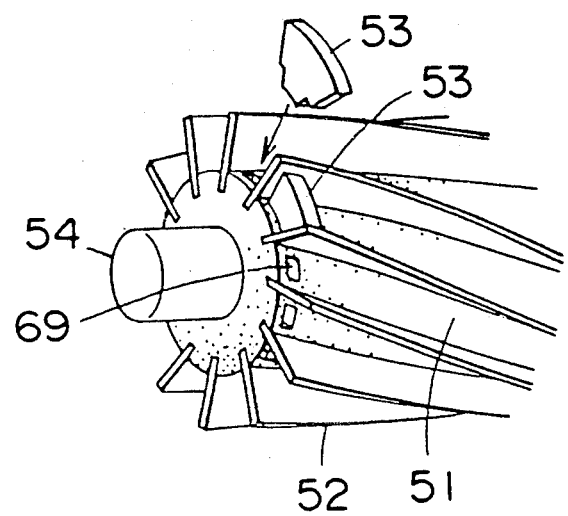
FIG. 35 is a perspective view showing the end portion of a spiral cutter and a flange according to a further modification of the present invention.
Figure 36:
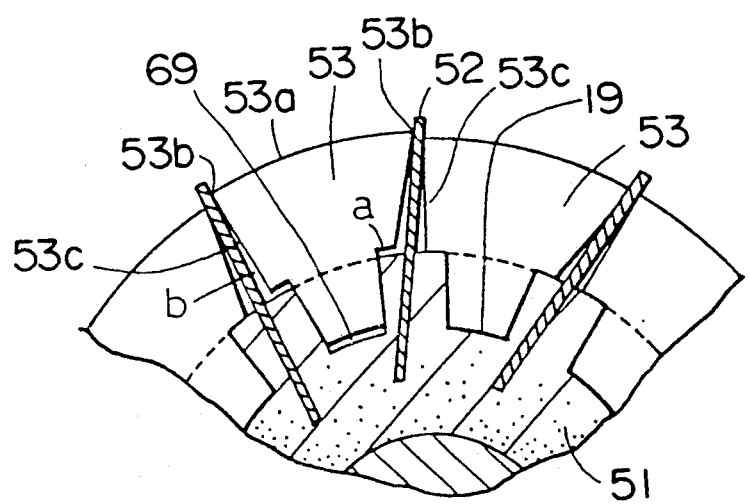
FIG. 36 is a side elevation showing the end portion of the spiral cutter and the flange as shown in FIG. 35.

As shown in FIGS. 35 and 36, fan-shaped flanges 53 can be inserted into concave portions 69, formed between adjacent blades 52 on the end surface of the base 51, in a direction perpendicular to the rotation shaft 54 so as to embed the flanges 53 in the base 51. In this case, as shown in FIG. 36, the ununiformity of the rake angle of each of the blades 52 which is likely to be created during insert-molding of the blades 52 in the base 51 can be corrected by differentiating the insertion amounts of the adjacent flanges 53 relative to each other. In this case, both ends 53b of the circular edge 53a of each of the flanges 53 are brought into contact with the blades 52, and the gaps (a) between the flanges 53 and the peripheral surface of the base 51 as well as the gaps (b) between the side edges and the blades 52 are set so that the cut mustache hairs do not pass therethrough.

Figure 37:
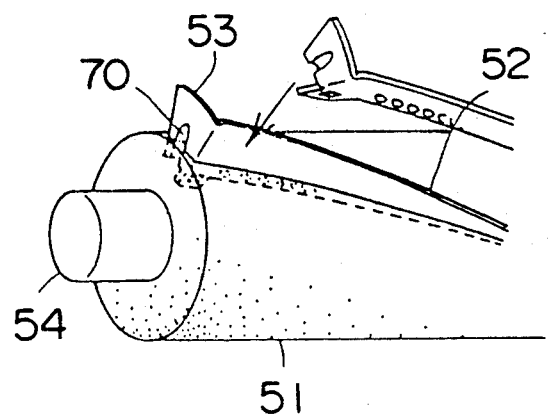
FIG. 37 is a perspective view showing the end portion of a spiral cutter and a flange according to a still further modification of the present invention.
Figure 38:
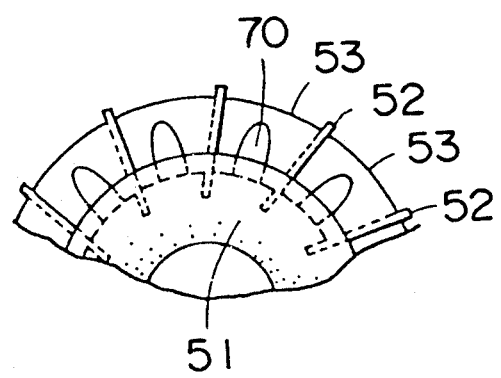
FIG. 38 is a side elevation showing the end portion of the spiral cutter and the flange as shown in FIG. 37.

As shown in FIGS. 37 and 38, it is possible to bend the end portion of the blade 52 into an L-shaped configuration and integrate the flange 53 with the blade 52 in such a manner that the configuration of the end portion of the blade 52 conforms to the circular configuration of the base 51, and then embed the lower portion of the flange 53 and the lower end portion of the blade 52 into the base 51. In this case, a sectionally circular-arc rib 70 for preventing the buckling of the flange 53 is formed on the flange 53 and resin or aluminum which is the material of the base 51 is applied to a concave portion formed in the exterior of the rib 70. Thus, the flange 53 can be prevented from buckling and the lower end of the blade 52 can be reliably held.

Fifth Embodiment

Referring to FIGS. 39 through 44, a fifth embodiment according to the present invention is described below.

Figure 41:
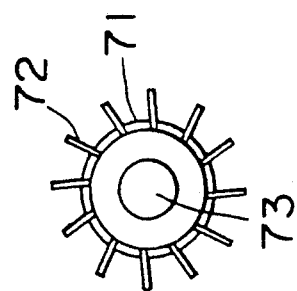
FIGS. 39 through 44 show a spiral cutter according to a fifth embodiment of the present invention.
Figure 39:
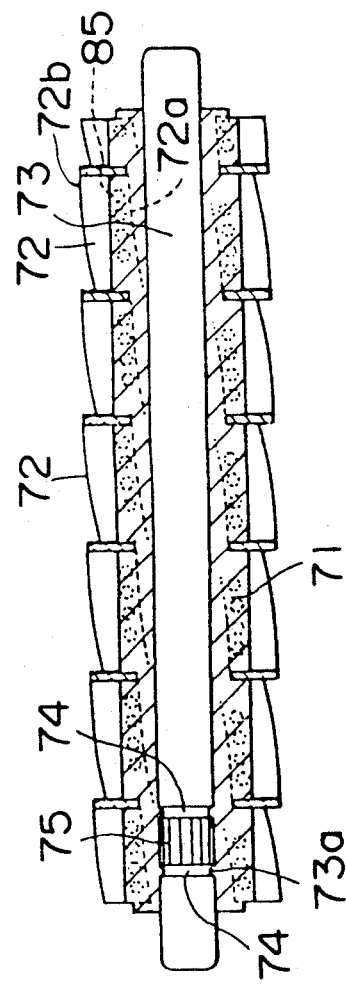
Figure 40:
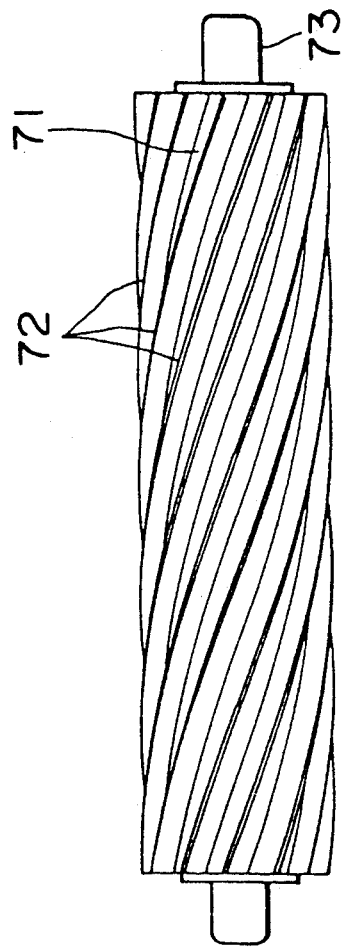

Referring to FIGS. 39 through 41, a plurality of spiral blades 72, which are thin, twistable and made of a stainless steel plate is embedded, with the blade 72 forming a certain angle with the axis of the base 51, in a base 71 which is cylindrical and made of a synthetic resin such as PBT resin or a mixture of the PBT resin containing glass fiber and having an adiabatic performance. A rotation shaft 73 made of a metal such as a stainless steel bar (SUS420J2) or synthetic resin such as polycarbonate having a greater rigidity than synthetic resin is inserted into the center of the base 71. Both ends of the rotation shaft 73 project from both end faces of the base 71.

When the blade 72 is used as the blade of a lint remover or an electric razor, the edge of the blade 72 is in sliding contact with a fixed blade thereof. As a result, heat is generated. In order to efficiently diffuse the heat generated in the blade edge, the synthetic resin of the base 71 may be mixed with metal powders having a high heat conductive performance such as aluminum or brass. In order to improve the strength of the base 71, instead of glass fiber, metal shavings may be dispersed and mixed with the resin.

If a high cutting performance is required, the rotation shaft 73 is made of a metal. If the blade 72 is used in a lint remover, i.e., if a low cutting performance is required, the rotation shaft 73 may be molded separately from the base 71. In this case, preferably, the resin of the rotation shaft 73 has a higher rigidity than the resin of the base 71.

In order to prevent the rotation shaft 73 from being removed from the base 71, two grooves 74 are provided on the peripheral surface of the base 71 at a position 73a in the vicinity of one end of the rotation shaft 73. Further, a knurled portion 75 for preventing the rotation of the rotation shaft 73 is provided between the grooves 74.

Figure 43:
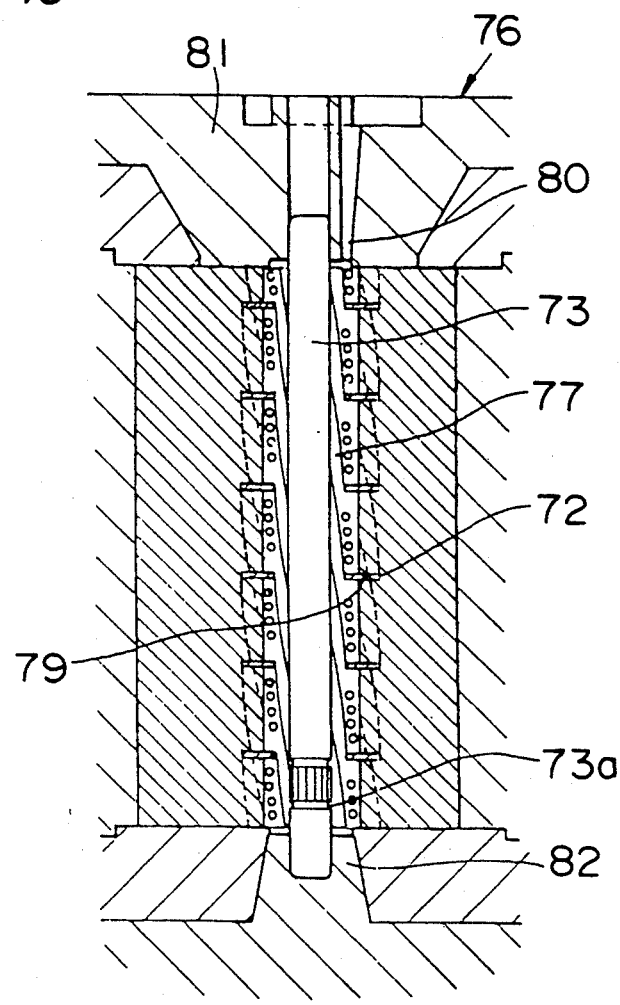

FIG. 43 is a sectional view showing the construction of a molding die 76. The die comprises a cavity 77, corresponding to the base 71, provided in the center thereof and a plurality of spiral grooves 79, provided in the inner periphery of the cavity 77, for holding the blades 72 twisted at a certain angle.

The method for molding the spiral cutter is described below. First, the blade 72 is inserted into the groove 79 so as to hold the blade 72 with the blade 72 twisted at a certain angle. Both the upper end and lower end of the die 76 are vertically held by a spool bushing 81 and a lower die 82 of the die 76 with the rotation shaft 73 provided in the center of the cavity 77. In this case, preferably, the distance between the position 73a of the rotation shaft 73 and the point, of the lower die 82, for supporting the lower end of the rotation shaft 73 is made small so that the bending moment at the position 73a is made small.

Then, melted resin such as PBT resin containing glass fibers is injected from a gate 80 of the die 76 into the cavity 77 thereof. Thus, the base 71 is molded and the lower end 72a of the blade 72 is embedded in the base 71 with the blade 72 forming a predetermined angle with the axis of the base 71 and the rotation shaft 73 is embedded in the center of the base 71. Since the position 73a of the rotation shaft 73 is near the point, of the lower die 82, for supporting the lower end of the rotation shaft 73, the rotation shaft 73 is not bent even though bending stress is applied to the position 73a.

After the molten resin is hardened, the spool bushing 81 is removed from the die 76 and the molded spiral blade is removed upwardly from the die 76 along the spiral groove 79.

Figure 44:
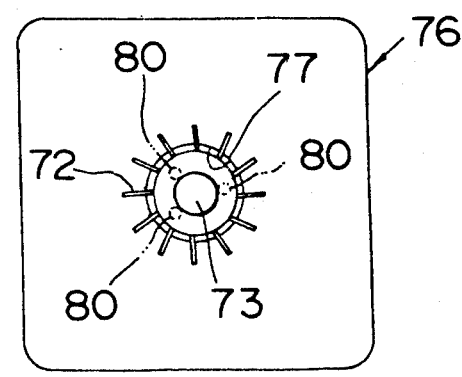

As shown in FIG. 44, preferably, the gate 80 is provided as near as possible to the rotation shaft 73 so as to prevent the blade 72 from being moved from the groove 79 into the cavity 77 by the pressure of the resin.

As shown in FIG. 44, it is preferable that the position of the gate 80 is arranged between lines extended from the lower end portions 72a of the adjacent blades 72 so that the molten resin flows along the configuration of the blade 72 and residual stress of the base 71 is reduced after the molding is completed.

Figure 42:
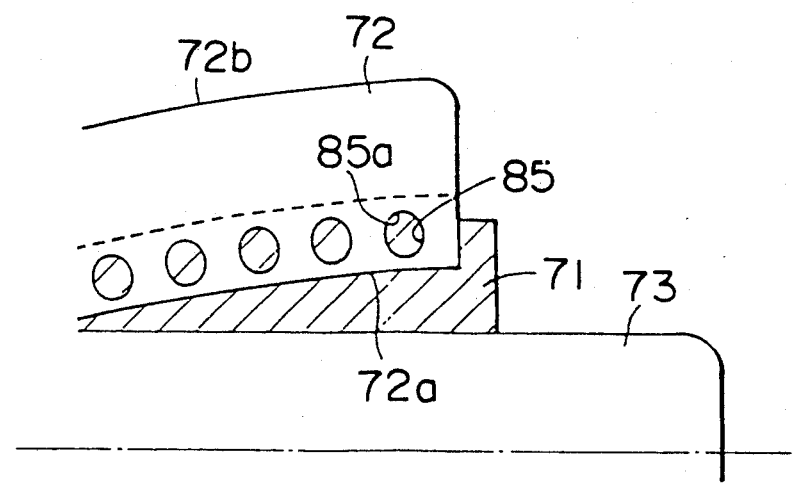

As shown in FIG. 42, through-holes 85 are formed in the vicinity of the lower end portion 72a of the blade 72 and the blade 72 in the vicinity of the upper end portion of the through-hole 85 is embedded in the base 71 so that the effective length (length except the diameter of throughhole) of blade 72 embedded in the base 71 is made smaller than the blade 72 in the vicinity of the upper end portion 72b. Thus, the heat generated along the edge of the blade 72 as a result of the sliding contact between the blade 72 and the fixed blade is prevented from being transmitted to the base 71 to a great extent.

In the fifth embodiment, in holding the rotation shaft 73 in the die 76, the position 73a for preventing the rotation shaft 73 from being removed from the base 71 is arranged to be near the lower die 82 for supporting the lower end portion of the rotation shaft 73. But the position 73a may be provided near the spool bushing 81 for supporting the upper end of the rotation shaft 73.

Figure 45:
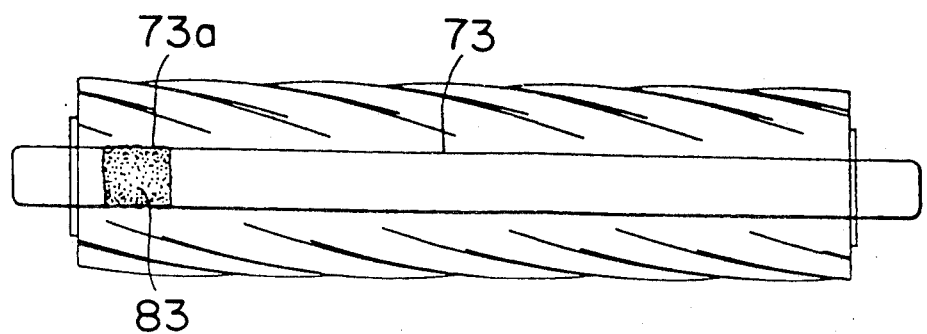
FIG. 45 is a plan view of a rotation shaft according to a modification of the present invention.

FIG. 45 shows a modification of the rotation shaft 73 according to the present invention. An irregular surface 83 is formed on the peripheral surface at the position 73a of the rotation shaft 73 by, for example, the rotation shaft 73 from being removed from the base 71.

Figure 46:
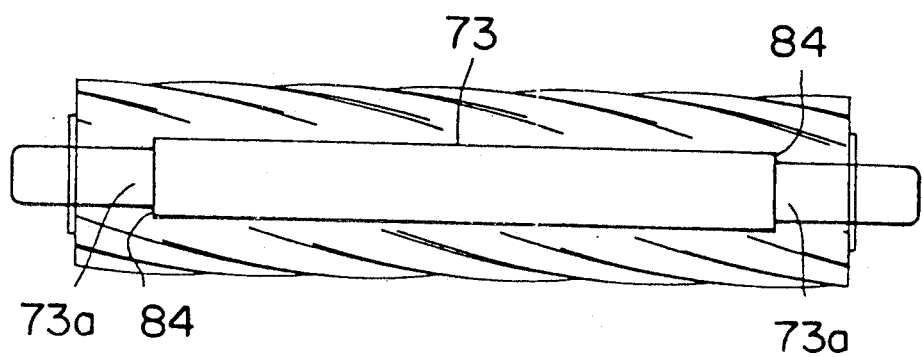
FIG. 46 is a plan view of a rotation shaft according to another modification of the present invention.

FIG. 46 shows another modification of the rotation shaft 73 according to the present invention. A step 84 is provided in the vicinity of the position 73a so as to prevent the removal of the rotation shaft 73 from the base 71.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A molding die to be used for manufacturing a spiral cutter for use in an electric razor, said molding die being cylindrical and adapted to mold a band-shaped blade by inserting said band-shaped blade into the peripheral surface of a body with said band-shaped blade torsionally deformed, and said molding die having a cavity for molding said body and a plurality of spiral grooves, provided in the inner peripheral surface of said cavity, into which the upper end portion of said band-shaped blade is inserted with torsional load applied to said band-shaped blade, said molding die comprising two or more blocks divided in the circumferential direction thereof along lines conforming to the spirality of said spiral grooves.

2. A molding die to be used for manufacturing a spiral cutter for use in an electric razor, said molding die being cylindrical and adapted to mold a band-shaped blade by inserting said band-shaped blade into the peripheral surface of a body with said band-shaped blade torsionally deformed, and said molding die having a cavity for molding said body and a plurality of spiral grooves, provided in the inner peripheral surface of said cavity, into which the upper end portion of said band-shaped blade is inserted with torsional load applied to said band-shaped blade, said molding die comprising two or more blocks divided along the axial direction thereof.

3. A molding die as defined in claim 1 or 2,
wherein an angle corresponding to a rake angle of said band-shaped blade is formed on each spiral groove such that a torsional deformation is decreasingly applied from the middle portion of said band-shaped blade toward the torsion start end thereof and increasingly applied from the middle portion of said band-shaped blade toward the torsion termination end thereof.

4. A spiral cutter for use in an electric razor, comprising:
a rotation shaft;
a single unitary cylindrical adiabatic body mounted to and about said rotation shaft; and
a plurality of band-shaped blades, each of which is formed of an elastic material, has an outer portion and a base portion, and is insert-molded with said adiabatic body such that said base portion is embedded in a circumferential periphery of said adiabatic body and said outer portion extends substantially radially outwardly from said adiabatic body so that said band-shaped blades are formed integrally with said adiabatic body and form spiral cutting edges having a predetermined torsional angle.

5. A spiral cutter as recited in claim 4, wherein at longitudinally opposing ends of each of said blades, said outer portion and said base portion are bent to have a gable-shaped longitudinal section.

6. A spiral cutter as recited in claim 4, wherein said adiabatic body is integrally molded with said rotation shaft.

7. A spiral cutter as recited in claim 4, wherein each of said band-shaped blades is formed in an arc-shape, such that said outer portion of said blade is longer than said base portion thereof.

8. A spiral cutter as recited in claim 4, wherein each of said band-shaped blades is bent, along a boundary line between said outer portion and said base portion, into a multiple-broken line configuration such that right side walls of a predetermined length are connected with one another in a gable-shaped configuration from one longitudinal end of said band-shaped blade to the other longitudinal end thereof so that an outer edge of said outer portion is formed in a continuously changing spiral configuration.

9. A spiral cutter as recited in claim 4, further comprising
a radially outwardly protruding circumferential flange mounted at one longitudinal end of said adiabatic body.

10. A spiral cutter as recited in claim 9, wherein said flange comprises a plurality of flange parts, each of which is mounted between adjacent ones of said band-shaped blades.

11. A spiral cutter as recited in claim 4, wherein said adiabatic body is formed of plastic.

12. A spiral cutter as recited in claim 11, wherein a portion of said rotation shaft is configured to define a preventing means for preventing said rotation shaft from being removed from said adiabatic body.

13. A spiral cutter as recited in claim 12, wherein said portion of said rotation shaft defining said preventing means is formed adjacent one of said longitudinal ends of said rotation shaft.

14. A method for manufacturing a spiral cutter for use in an electric razor, comprising the steps of:
providing a body molding die;
mounting a torsionally deformed band-shaped blade formed of an elastic material in said body molding die;
molding a single unitary body in said body molding die such that said body is molded integrally with said torsionally deformed band-shaped blade; and
removing said body and said band-shaped blade molded integrally therewith from said body molding die.

15. A method as recited in claim 14, wherein said body molding die is formed with a substantially cylindrical cavity therein and at least one slit extending radially outwardly from said cavity and extending longitudinal along said cavity in a spiral configuration.

16. A method as recited in claim 15, wherein said at least one slit comprises a plurality of slits; and
said step of mounting comprises mounting a plurality of torsionally deformed band-shaped blades formed of elastic material in said plurality of slits of said body molding die.

17. A method as recited in claim 14, wherein prior to said step of mounting, a torsional deformation is decreasingly applied to said band-shaped blade from a middle portion thereof toward a torsion start end thereof and is increasingly applied from said middle portion thereof toward a torsion termination end thereof.

18. A method as recited in claim 14, wherein said step of molding is carried out by injection molding.

19. A method as recited in claim 14, wherein said body molding die is provided with gates at a longitudinal end thereof such that they open into a longitudinal end of said cavity.

20. A method as recited in claim 19, wherein said step of mounting comprises mounting a plurality of torsionally deformed band-shaped blades formed of an elastic material in said body molding die; and
said gates are formed in said body molding die such that said gates open into said cavity radially between a position of a rotation shaft for said body and base ends of said plurality of band shaped blades.

* * * * *